(12) United States Patent
Birru et al.

(10) Patent No.: US 12,393,575 B2
(45) Date of Patent: Aug. 19, 2025

(54) MULTI-TABLE QUESTION ANSWERING SYSTEM AND METHOD THEREOF

(71) Applicant: Quantiphi, Inc., Marlborough, MA (US)

(72) Inventors: Dagnachew Birru, Marlborough, MA (US); Mihir Athale, Mumbai (IN); Rohit Agrawal, Mumbai (IN); Muneeswaran I, Mumbai (IN); Saisubramaniam Gopalakrishnan, Mumbai (IN); Vishal Vaddina, Toronto (CA)

(73) Assignee: Quantiphi, Inc., Marlborough, MA (US)

( * ) Notice: Subject to any disclaimer, the term of this patent is extended or adjusted under 35 U.S.C. 154(b) by 0 days.

(21) Appl. No.: 18/545,617

(22) Filed: Dec. 19, 2023

(65) Prior Publication Data

US 2024/0143584 A1    May 2, 2024

(51) Int. Cl.
　　*G06F 16/34*　　(2025.01)
　　*G06F 16/21*　　(2019.01)
　　*G06F 16/242*　(2019.01)

(52) U.S. Cl.
　　CPC .......... *G06F 16/243* (2019.01); *G06F 16/211* (2019.01)

(58) Field of Classification Search
　　CPC .............................. G06F 16/243; G06F 16/211
　　See application file for complete search history.

(56) References Cited

U.S. PATENT DOCUMENTS

| | | | | |
|---|---|---|---|---|
| 5,963,940 | A * | 10/1999 | Liddy | G06F 16/353 707/999.005 |
| 6,026,388 | A * | 2/2000 | Liddy | G06F 16/3344 707/999.005 |
| 11,755,569 | B2 * | 9/2023 | Diefenbach | G06F 40/205 707/723 |
| 2007/0011150 | A1 * | 1/2007 | Frank | G06F 16/9537 |
| 2009/0070298 | A1 * | 3/2009 | Thione | G06F 16/3344 |
| 2011/0125734 | A1 | 5/2011 | DubOue et al. | |
| 2012/0077888 | A1 * | 3/2012 | Ramtoola | A61P 29/00 264/122 |
| 2016/0282050 | A1 * | 9/2016 | Deutch | F28D 1/035 |
| 2022/0374459 | A1 | 11/2022 | Liu et al. | |
| 2024/0403545 | A1 * | 12/2024 | Nahum | G06F 3/0481 |
| 2025/0004928 | A1 * | 1/2025 | Baker | G06F 11/3688 |

OTHER PUBLICATIONS

Ye, Yunhu et al; Large Language Models are Versatile Decomposers: Decompose Evidence and Questions for Table-based Reasoning; Apr. 27, 2023; https://arxiv.org/pdf/2301.13808.pdf.

* cited by examiner

*Primary Examiner* — Baoquoc N To
(74) *Attorney, Agent, or Firm* — D'Ambrosio & Menon, PLLC; Usha Menon

(57) ABSTRACT

A method and system for multi-table question answering is provided herein. The method includes receiving a complex question from a user. The method may further include decomposing the complex question into one or more sub-questions using one or more of but not limited to coreference resolution, dependency parsing, chunking and prompt techniques. The method may further include generating code scripts for each sub-question using a Large Language Model (LLM). The method may further include executing the code scripts to retrieve relevant structured data from a plurality of tables. The method may further include generating an answer to the complex question based on the retrieved structured data.

20 Claims, 13 Drawing Sheets

MULTI-TABLE QUESTION ANSWERING SYSTEM AND METHOD THEREOF

FIELD OF THE INVENTION

The present disclosure relates to question answering systems, and more specifically to a multi-table question answering system and method.

BACKGROUND OF THE INVENTION

The field of question answering has been growing rapidly in recent years. There are many different approaches to question answering, but one of the most promising approaches is to use large language models (LLMs). LLMs are trained on a massive database of text and code, and they can be used to generate text, translate languages, write different kinds of creative content, and answer your questions in an informative way.

Existing approaches in the prior art have primarily focused on pre-training and fine-tuning large language models (LLMs) explicitly for multi-table question answering. These approaches often require significant computational resources, domain-specific databases, and time-consuming fine-tuning processes.

Additionally, some prior art systems may rely on fixed schemas that dictate the structure of data tables. These fixed schemas can limit the adaptability of the system to different databases and domains. Moreover, fine-tuning LLMs for specific tables or databases in some prior art systems can be expensive and not easily scalable to handle new data sources.

Therefore, in order to overcome the aforementioned limitations, there exists a need for a multi-table question answering (MTQA) system and method with question decomposition. MTQA enables the retrieval of relevant structured data from multiple tables in response to complex user queries and the generation of accurate answers based on the retrieved data making it a more efficient and scalable solution for multi-table question answering. Furthermore, the ability to dynamically adapt to schema descriptions enhances its applicability across diverse database and domains.

1. SUMMARY

The following embodiments presents a simplified summary in order to provide a basic understanding of some aspects of the disclosed invention. This summary is not an extensive overview, and it is not intended to identify key/critical elements or to delineate the scope thereof. Its sole purpose is to present some concepts in a simplified form as a prelude to the more detailed description that is presented later.

Some example embodiments disclosed herein provide computer-implemented method for multi-table question answering, the method may include receiving a complex question from a user. The method may further include decomposing the complex question into one or more sub-questions. The one or more sub-questions may be in a natural language. The method may further include generating code scripts for each sub-question using a Large Language Model (LLM). The method may further include executing the code scripts to retrieve relevant structured data from a plurality of tables. The method may further include generating an answer to the complex question based on the retrieved structured data.

According to some example embodiments, the complex question is decomposed into the one or more sub-questions using one or more of but not limited to coreference resolution, dependency parsing, chunking and prompts.

According to some example embodiments, the method further comprises fine-tuning the LLM on a database schema as input to generate description as response.

According to some example embodiments, the method further comprises generating a pseudo code for each of the one or more sub-questions using the LLM; parsing the generated pseudo code to generate corresponding code-scripts using LLM in sub-question parser; executing the generated code scripts to retrieve relevant structured-data from the plurality of tables; and generating an answer to the complex question based on the retrieved structured-data.

According to some example embodiments, the method further comprises employing Prompt Engine to instruct the LLM along with database schema to generate database schema description; and upon generating, incorporating the database schema description into the code scripts to specify table and column information.

According to some example embodiments, the method further comprises employing Prompt Engine to instruct the LLM for each respective task such as generating database schema description, generating pseudo-code for the one or more sub-questions, generating code scripts for the one or more sub-questions, and a final answer generation.

According to some example embodiments, the method further involves validating the generated code scripts using an automatic validator, retrieving the code for each sub-task from the repository, merging the retrieved code and write it to a code file.

According to some example embodiments, the method further consists of executing the code file as a script; and saving the output of the script to a separate file.

According to some example embodiments, the database schema description for the table and column are dynamically generated and updated based on external descriptions provided for individual tables and columns.

According to some example embodiments, the database schema description is formatted by the LLM in a format: Column Name|Data Type|Description.

According to some example embodiments, the answer to the complex question is presented to a user via a graphical user interface (GUI).

According to some example embodiments, the method further involves combining code script outputs corresponding to each sub-tasks of the complex question; and generating an answer based on each code script outputs and the user question using the LLM.

Some example embodiments disclosed herein provide a computer system for multi-table question answering, the computer system comprising one or more computer processors, one or more computer readable memories, one or more computer readable storage devices, and program instructions stored on the one or more computer readable storage devices for execution by the one or more computer processors via the one or more computer readable memories, the program instructions comprising receiving a complex question from a user. The one or more processors are further configured for decomposing the complex question into one or more sub-questions. The one or more sub-questions may be in a natural language. The one or more processors are further configured for generating code scripts for each sub-question using a Large Language Model (LLM). The one or more processors are further configured for executing the code scripts to retrieve relevant structured data from a plurality of tables. The one or more processors are further configured for generating an answer to the complex question based on the retrieved structured data.

Some example embodiments disclosed herein provide a non-transitory computer readable medium having stored thereon computer executable instruction which when executed by one or more processors, cause the one or more processors to carry out operations for multi-table question answering, the operations comprising receiving a complex question from a user. The operations further include decomposing the complex question into one or more sub-questions. The one or more sub-questions may be in a natural language. The operations further comprising generating code scripts for each sub-question using a Large Language Model (LLM). The operations further comprising executing the code scripts to retrieve relevant structured data from a plurality of tables. The operations further comprising generating an answer to the complex question based on the retrieved structured data.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The above and still further example embodiments of the present invention will become apparent upon consideration of the following detailed description of embodiments thereof, especially when taken in conjunction with the accompanying drawings, and wherein.

Figure 1:
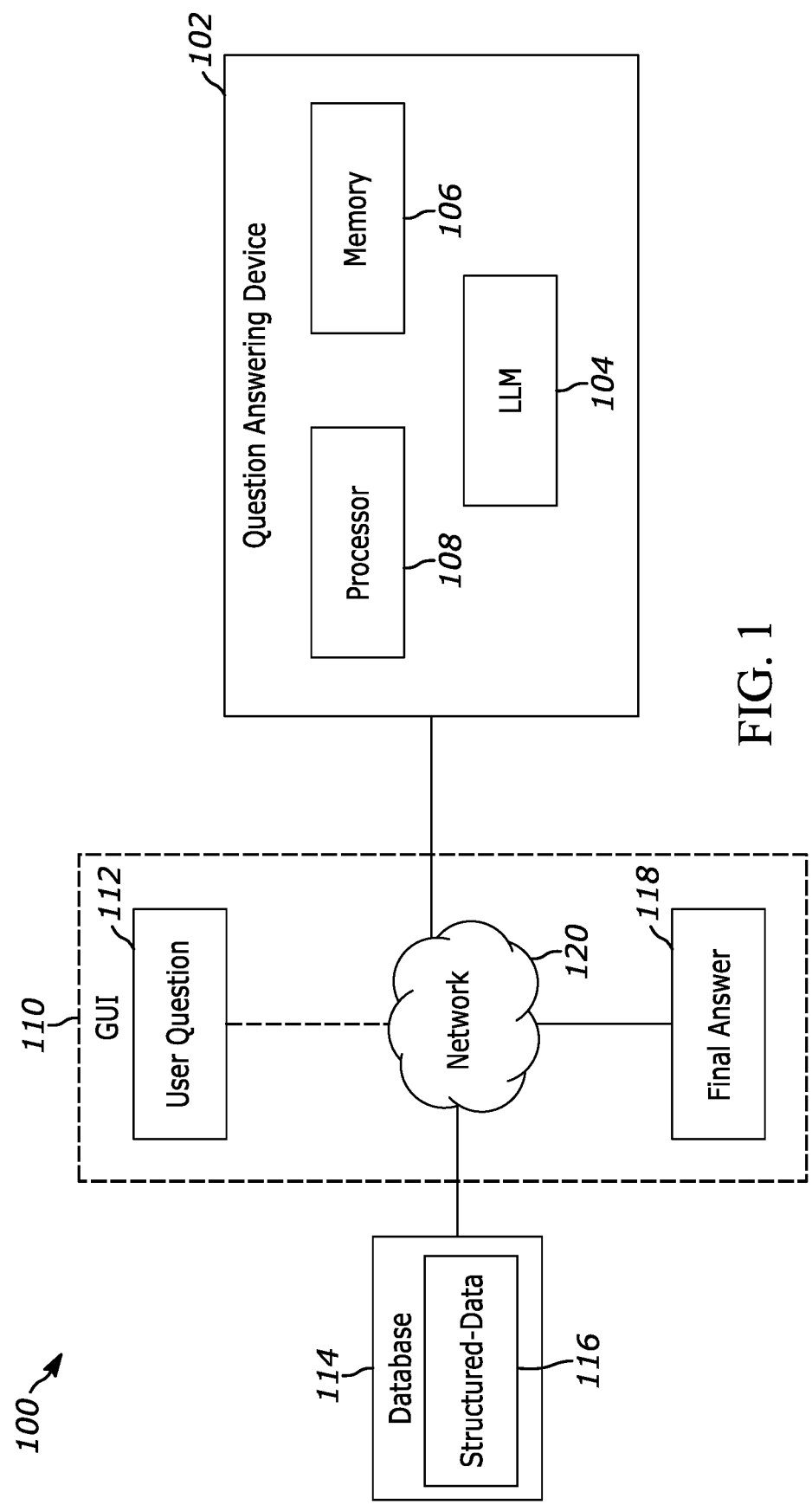
FIG. 1 is a block diagram of an environment of a system for multi-table question answering, in accordance with an example embodiment.

The figures illustrate embodiments of the invention for purposes of illustration only. One skilled in the art will readily recognize from the following description that alternative embodiments of the structures and methods illustrated herein may be employed without departing from the principles of the invention described herein.

2. DETAILED DESCRIPTION

In the following description, for purposes of explanation, numerous specific details are set forth in order to provide a thorough understanding of the present invention. It will be apparent, however, to one skilled in the art that the present invention can be practiced without these specific details. In other instances, systems, apparatuses, and methods are shown in block diagram form only in order to avoid obscuring the present invention.

Reference in this specification to "one embodiment" or "an embodiment" or "example embodiment" means that a particular feature, structure, or characteristic described in connection with the embodiment is included in at least one embodiment of the present invention. The appearance of the phrase "in one embodiment" in various places in the specification are not necessarily all referring to the same embodiment, nor are separate or alternative embodiments mutually exclusive of other embodiments. Further, the terms "a" and "an" herein do not denote a limitation of quantity, but rather denote the presence of at least one of the referenced items. Moreover, various features are described which may be exhibited by some embodiments and not by others. Similarly, various requirements are described which may be requirements for some embodiments but not for other embodiments.

Some embodiments of the present disclosure will now be described more fully hereinafter with reference to the accompanying drawings, in which some, but not all, embodiments of the invention are shown. Indeed, various embodiments of the invention may be embodied in many different forms and should not be construed as limited to the embodiments set forth herein; rather, these embodiments are provided so that this disclosure will satisfy applicable legal requirements. Like reference numerals refer to like elements throughout.

The terms "comprise", "comprising", "includes", or any other variations thereof, are intended to cover a non-exclusive inclusion, such that a setup, device, or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

Furthermore, one or more computer-readable storage media may be utilized in implementing embodiments consistent with the present invention. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., are non-transitory. Examples include random access memory (RAM), read-only memory (ROM), volatile memory, non-volatile memory, hard drives, CD ROMs, DVDs, flash drives, disks, and any other known physical storage media.

The embodiments are described herein for illustrative purposes and are subject to many variations. It is understood that various omissions and substitutions of equivalents are contemplated as circumstances may suggest or render expedient but are intended to cover the application or implementation without departing from the spirit or the scope of the present invention. Further, it is to be understood that the phraseology and terminology employed herein are for the purpose of the description and should not be regarded as limiting. Any heading utilized within this description is for convenience only and has no legal or limiting effect.

Definitions

The term "module" used herein may refer to a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The term "machine learning model" may be used to refer to a computational or statistical or mathematical model that is trained on classical ML modelling techniques with or without classical image processing. The "machine learning model" is trained over a set of data and using an algorithm that it may be used to learn from the database.

The term "artificial intelligence" may be used to refer to a model built using simple or complex Neural Networks using deep learning techniques and computer vision algorithms. Artificial intelligence model learns from the data and applies that learning to achieve specific pre-defined objectives.

End of Definitions

Embodiments of the present disclosure may provide a method, a system, and a computer program product for predicting molecular properties. The method, the system, and the computer program product answering to the complex question in such an improved manner are described with reference to FIG. 1 to FIG. 13 as detailed below.

FIG. 1 illustrates a block diagram of an environment of a system 100 for multi-table question answering. Structured question answering can be challenging due to the complexity of the two main steps involved: Information Retrieval and Answer Generation. These steps depend on the type of information available, and the quality of the models used. If the data is spread across multiple tables, the task becomes even more difficult. To address this issue, The proposed system 100 uses a multi-step approach that allows to handle complex data without being limited by a single schema for a single table. The approach involves decomposing the question and generating code script to identify and retrieve the necessary data. The proposed system 100 uses a parser and executor to automate this process. The proposed system 100 can even handle database with minimal descriptions using a schema description module. In the end, data may be consolidated from multiple tables to generate a final answer based on the maximum available context.

The system 100 includes a question answering device 102, a Graphical User Interface (GUI) 110 associated with a user, and a database 114. The question answering device 102 may be communicatively coupled with the GUI 110 via a network 120. Examples of the question answering device 102 may include, but are not limited to, a server, a desktop, a laptop, a notebook, a tablet, a smartphone, a mobile phone, an application server, or the like.

The network 120 may be wired, wireless, or any combination of wired and wireless communication networks, such as cellular, Wi-Fi, internet, local area networks, or the like. In one embodiment, the network 120 may include one or more networks such as a data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (Wi-Fi), wireless LAN (WLAN), Bluetooth®, Internet Protocol (IP) data casting, satellite, mobile ad-hoc network (MANET), and the like, or any combination thereof.

The question answering device 102 may be capable of answering a complex question asked by the user via the GUI 110. In particular, the user may first input complex question 112 or a complex user search request by accessing the GUI 110. The term "complex question" or "complex user search request" may refer to queries or inquiries posed by users that exhibit difficulties and complex information needs. Such complexities may include, but are not limited to, questions that involve conditional logic, queries requiring the extraction of data from multiple tables or data sources, inquiries with multiple sub-components, or requests demanding comprehensive data analysis across diverse domains.

For better explanation of the term "complex question" or "complex user search request", consider a healthcare database that includes patient records, medical procedures, and billing information stored in separate tables. Suppose a user wants to know the total cost of specific medical procedures performed on patients aged 65 and older who were diagnosed with a particular medical condition.

Now, let us break down why this qualifies as the "complex question":

Conditional Logic: The question involves multiple conditions, including age (65 and older) and a specific medical condition. These conditions create complexity in formulating the query.

Data Retrieval from Multiple Tables: To answer this question, data must be retrieved from at least three different tables: patient records (for age and medical condition), medical procedures (for cost), and billing information (for billing details).

Multiple Sub-Components: The question may be broken down into multiple sub-questions, for example, identify patients aged 65 and older with the specific medical condition, determine the medical procedures performed on these patients, retrieve the cost associated with each procedure, and calculate the total cost.

Comprehensive Data Analysis: The question requires a comprehensive analysis of data across diverse domains (for example, patient records, medical procedures, and billing), which adds to the complexity.

In the described scenario, the question's complexity may arise from the combination of conditions, data retrieval from multiple tables, the need to break it into sub-questions, and the requirement for comprehensive data analysis. Such complicated and complex queries are commonly referred to as "complex questions". Therefore, the present invention described in subsequent parts of the disclosure aims to address challenges in answering such complex questions effectively and accurately.

The question answering device 102 may include a Large Language model (LLM) 104, which may further include various modules that enable the question answering device 102 to answer the complex question. These modules are explained in detail in conjunction with FIG. 2.

In order to answer the complex question, the question answering device 102 may be configured to receive the complex user question 112 through the GUI 110 and via the network 120.

Further, the question answering device 102 may decompose the complex question into one or more sub-questions using one or more of but not limited to coreference resolution, dependency parsing, chunking, and prompts. Further, the question answering device 102 may generate code scripts for each sub-question using the LLM 104 in sub-question parser.

The database 114 represents a structured data that the system 100 may access to answer user questions. It may include multiple tables containing diverse information, and the tables may vary in size and complexity. The database 114 is an essential resource for the system 100, as it provides the raw data required to generate meaningful answers. The question answering device 102 may further execute the code scripts to retrieve relevant structured data 116 from a plurality of tables of the database 114.

Further, the question answering device 102 may generate answer (e.g., final answer 118) to the complex question based on the retrieved structured data. The complete process followed by the system 100 is further explained in detail in conjunction with FIG. 2 to FIG. 13.

The question answering device 102 may further include a memory 106, and a processor 108. The term "memory" used herein may refer to any computer-readable storage medium, for example, volatile memory, random access memory (RAM), non-volatile memory, read only memory (ROM), or flash memory. The memory 106 may include a Random-Access Memory (RAM), a Read-Only Memory (ROM), a Complementary Metal Oxide Semiconductor Memory (CMOS), a magnetic surface memory, a Hard Disk Drive (HDD), a floppy disk, a magnetic tape, a disc (CD-ROM, DVD-ROM, etc.), a USB Flash Drive (UFD), or the like, or any combination thereof.

The term "processor" used herein may refer to a hardware processor including a Central Processing Unit (CPU), an Application-Specific Integrated Circuit (ASIC), an Application-Specific Instruction-Set Processor (ASIP), a Graphics Processing Unit (GPU), a Physics Processing Unit (PPU), a Digital Signal Processor (DSP), a Field Programmable Gate Array (FPGA), a Programmable Logic Device (PLD), a Controller, a Microcontroller unit, a Processor, a Microprocessor, an ARM, or the like, or any combination thereof.

The processor 108 may retrieve computer program code instructions that may be stored in the memory 106 for execution of the computer program code instructions. The processor 108 may be embodied in a number of different ways. For example, the processor 108 may be embodied as one or more of various hardware processing means such as a coprocessor, a microprocessor, a controller, a digital signal processor (DSP), a processing element with or without an accompanying DSP, or various other processing circuitry including integrated circuits such as, for example, an ASIC (application specific integrated circuit), an FPGA (field programmable gate array), a microcontroller unit (MCU), a hardware accelerator, a special-purpose computer chip, or the like. As such, in some embodiments, the processor 108 may include one or more processing cores configured to perform independently. A multi-core processor may enable multiprocessing within a single physical package. Additionally, or alternatively, the processor 108 may include one or more processors configured in tandem via the bus to enable independent execution of instructions, pipelining and/or multithreading.

Additionally, or alternatively, the processor 108 may include one or more processors capable of processing large volumes of workloads and operations to provide support for big data analysis. In an example embodiment, the processor 108 may be in communication with a memory 106 via a bus for passing information among components of the system 100.

The memory 106 may be non-transitory and may include, for example, one or more volatile and/or non-volatile memories. In other words, for example, the memory 106 may be an electronic storage device (for example, a computer readable storage medium) comprising gates configured to store data (for example, bits) that may be retrievable by a machine (for example, a computing device like the processor 108). The memory 106 may be configured to store information, data, contents, applications, instructions, or the like, for enabling the apparatus to carry out various functions in accordance with an example embodiment of the present disclosure. For example, the memory 106 may be configured to buffer input data for processing by the processor 108. The memory 106 may also store various data (e.g., the question, the database, the code scripts, the retrieved information, the answer, the history of the user's questions and answers, etc.) that may be captured, processed, and/or required by the processor 108 of the question answering device 102 to answer the complex question.

Figure 2:
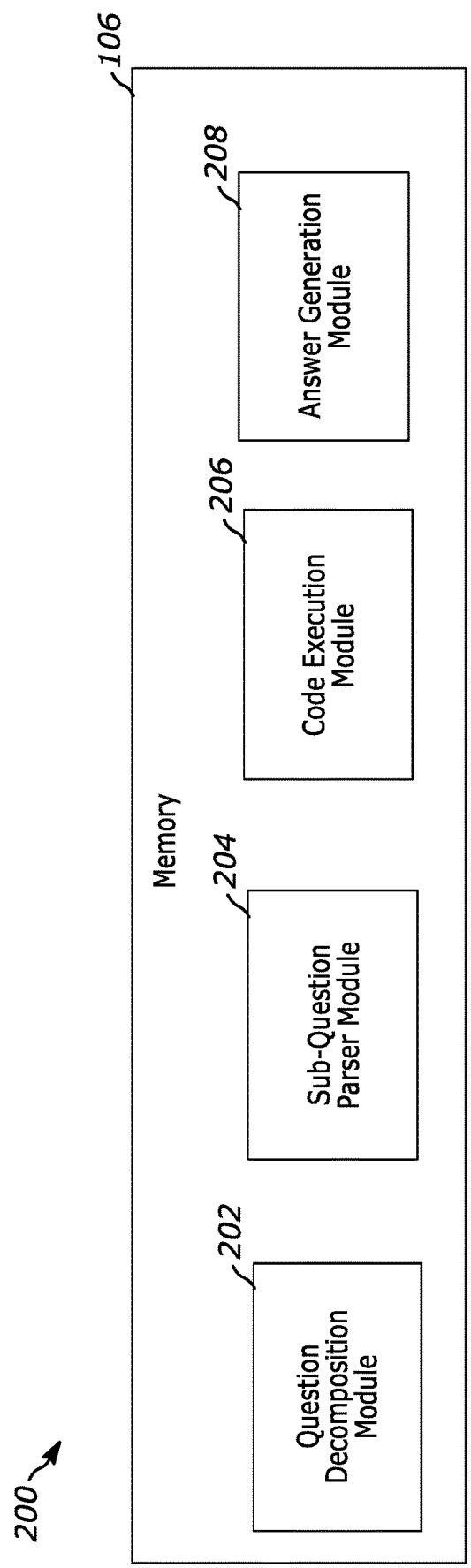
FIG. 2 is a block diagram illustrating various modules within a memory of a question answering device configured for multi-table question answering, in accordance with an example embodiment.

FIG. 2 illustrates a block diagram 200 of various modules within the memory 106 of the question answering device 102 that is configured to answer the user complex question, in accordance with an example embodiment. The memory 106 may include a question decomposition module 202, a sub-question parser module 204, a code execution module 206, and an answer generation module 208.

Once the question answering device 102 receives the complex question or a complex user search request, the process of multi-table question answering is initiated. The question decomposition module 202 is designed to break down complex user question into-a series of sub-questions. This is accomplished by employing one or more of but not limited to techniques such as coreference resolution, dependency parsing, chunking and prompts.

Coreference Resolution: Coreference resolution is a natural language processing (NLP) technique used to identify and connect words or phrases in a text that refer to the same entity. In the question decomposition, coreference resolution helps to identify and connect pronouns (e.g., "he," "she," "it") or noun phrases (e.g., "the doctor") to the entities they represent. This helps in understanding which entities or concepts are being referred to in the complex question and breaking it down into sub-questions related to those entities.

Dependency Parsing: Dependency parsing is an NLP technique that analyzes the grammatical structure of a sentence by identifying the relationships between words. In the question decomposition, dependency parsing helps in understanding the syntactical structure of the complex question. It identifies how words in the question are related to each other and helps in identifying the main subject, objects, and actions in the question, which may then be used to formulate sub-questions.

Chunking: Chunking, also known as shallow parsing, is a technique that groups words in a sentence into "chunks" based on their grammatical roles. In question decomposition, chunking helps to identify and extract meaningful phrases or chunks from the complex question. These meaningful chunks may represent key components of the question, such as subject, predicate, and objects, and may be used to formulate sub-questions.

Together, these techniques enable the question decomposition module 202 to analyze the structure and content of a complex user question, identify important entities and relationships, and break it down into a series of sub-questions that may be further processed to retrieve relevant information from multiple tables.

The LLMs are a class of artificial intelligence models designed for natural language understanding and generation. These models are characterized by their massive scale, often comprising tens of billions or even trillions of parameters. LLMs are built upon deep neural networks, particularly the Transformer architecture, which enables them to process and generate human-like text.

Some of the characteristics of LLMs are:

Scale: LLMs are known for their vast scale, which allows them to capture and learn intricate patterns in language. More parameters generally lead to improved performance in various language tasks.

Pre-training: LLMs undergo a pre-training phase where they are exposed to a massive amount of text data from the internet. During this phase, they learn grammar, syntax, semantics, and even world knowledge from the text.

Fine-tuning: After pre-training, LLMs are fine-tuned on specific tasks, making them versatile. They can be fine-tuned for various language tasks like text generation, translation, sentiment analysis, and question answering.

Contextual Understanding: LLMs excel at understanding context in language. They can infer meaning from surrounding words and sentences, which is crucial for answering complex questions or generating coherent responses.

Generalization: LLMs may generalize from the training data to handle unseen or complex language tasks. This generalization ability makes them adaptable to a wide range of applications.

Some of the examples of LLMs may include:

GPT-3 (Generative Pre-trained Transformer 3): GPT-3 is one of the most well-known LLMs. It has 175 billion parameters and can perform a wide array of natural language tasks, including language translation, text generation, question answering, and the like.

BERT (Bidirectional Encoder Representations from Transformers): BERT is a breakthrough in natural language understanding. It focuses on bidirectional contextual learning and has been fine-tuned for various language tasks.

T5 (Text-to-Text Transfer Transformer): T5 is another model that treats all NLP tasks as a text-to-text problem. It achieved state-of-the-art results in several language tasks.

The system 100 may employ Prompt Engine that generates custom prompts to instruct the LLM so as to get desirable outputs for underlying tasks such as generating a database schema description, generating pseudo code for the one or more sub-questions, generating code scripts for the one or more sub-questions, and final answer generation.

The database schema description assists the LLM in understanding the relationships between tables and the semantics of individual columns. For instance, it explains that a column "REASON_DESCRIPTION" in the database may correspond to disease names, and a column named "DISEASE_NAME" may carry the same meaning.

Once the complex user question is broken down into one or more—sub-questions, the sub-question parser module 204 may serve two primary functions. In one embodiment, the sub-question parser module 204 may be configured to directly generate code scripts for each sub-question using the LLM. In a more elaborative way, for each sub-question identified during the initial decomposition process, the sub-question parser module 204 instructs the LLM to generate corresponding code scripts. These code scripts are designed to interact with the database 114, accessing specific tables and columns to extract the required information.

In an alternative embodiment, the sub-question parser module 204 follows a two-step process. First, it employs the LLM to generate pseudo-code for each of the sub-questions. Pseudo-code is a human-readable representation of the code's logic but not the actual executable code. Then, the module parses the generated pseudo-code to produce the corresponding code-scripts. This intermediary step ensures that the code scripts accurately reflect the intended logic derived from the sub-questions.

Therefore, the sub-question parser module 204 may either directly translate sub-questions into code scripts or first generate pseudo-code representations and then convert them into executable code scripts, depending on the specific embodiment or configuration. This flexibility allows for precise and adaptable code generation based on the nature of the sub-questions and the requirements of the system 100.

An essential feature of the sub-question parser module 204 is its adaptability to dynamic schemas. Unlike traditional systems that rely on fixed schemas, this module has the capacity to accommodate schema descriptions provided externally for individual tables and columns. This flexibility is crucial when dealing with database where column names may not explicitly convey their contents. By externalizing schema descriptions, the system ensures that the LLM understands column names accurately in the context of specific tables. It should be noted that the LLM, without explicit descriptions, may not inherently discern that the column "REASON_DESCRIPTION" comprises disease names. In contrast, certain column names, like "DISEASE_NAME," are self-explanatory within an Electronic Health Record database.

Apart from generating corresponding code scripts, the sub-question parser module 204 plays an important role, primarily for parsing the code scripts generated for each sub-question. The sub-question parser module 204 ensures that the code scripts are well-structured and formatted, setting the stage for effective data retrieval and subsequent processing.

The database schema description is incorporated to the sub-question parser using the prompt generated by the Prompt Engine which helps the sub-question parser module 204 to ensure that these code scripts are correctly generated, formatted, free of errors, and ready for execution.

In addition to the database schema description, a Default code (template) file with data loader is a crucial component within the multi-table question answering system that is responsible for generating the code script. In a more elaborative way, the Default code (template) file with data loader contains a library of pre-defined code templates that are optimized for efficient data retrieval from the database. These templates serve as a foundational framework for generating code scripts based on the pseudo-code or sub-questions generated earlier in the process. The data loader ensures that the database is accessible and ready for querying. It plays a critical role in loading the database, making it available for data retrieval operations.

Once the code scripts have been generated, they are prepared for execution in the code execution module 206. The primary and central function of the execution module 206 is the execution of the generated code scripts. The code execution module 206 also validates the code scripts to identify any inconsistencies or issues. It ensures that the scripts conform to the expected structure and syntax. Additionally, the code execution module 206 may reformat the scripts if necessary to meet execution requirements. These scripts prepared and validated by the code execution module 206, includes precise instructions on how to access and retrieve data from the database 114. The code execution module 206 executes these scripts with precision, ensuring that the specified operations are carried out effectively.

The code execution module 206 is adept at interfacing with databases and data sources. It set up the retrieval of data from multiple tables within the database 114. This capability is essential for multi-table question answering, as it allows the system to access and aggregate information stored in diverse data tables.

Some examples of the types of tables or databases that may be part of the plurality of tables in such a system:

Electronic Health Records (EHR): In a healthcare context, the plurality of tables may include tables containing patient demographics, medical history, treatment records, and laboratory results. Each table would represent a different aspect of a patient's health data.

Retail Sales Database: For a retail business, the plurality of tables could include tables for product inventory, customer transactions, sales orders, and supplier information. These tables collectively store various aspects of the retail operations.

Academic Institution Database: In an educational setting, the plurality of tables might encompass tables for student records, course schedules, faculty information, and examination results. Each table would hold specific data related to the institution's academic operations.

Financial Services Database: In the financial sector, tables could represent different financial instruments such as stocks, bonds, and commodities. Each table may contain historical pricing data, trading volumes, and related financial metrics.

Inventory Management System: In a warehouse or inventory management system, tables could include stock levels, product details, order history, and supplier information. These tables collectively manage inventory and supply chain operations.

Social Media Analytics: In the realm of social media analytics, tables may hold data on user profiles, posts, likes, comments, and engagement metrics. Each table captures distinct aspects of social media interactions.

Government Census Data: A government database could consist of tables representing demographic information, employment statistics, housing data, and geographic details. These tables collectively provide a comprehensive view of a region's population and resources.

Scientific Research Databases: In scientific research, databases can encompass various experiments, observations, and measurements. Each database table may contain data on different variables and experimental conditions.

E-commerce Platform: In an e-commerce platform, tables may include product catalogs, customer orders, payment information, and shipping records. These tables support the online shopping experience and order processing.

Energy Grid Monitoring: For monitoring energy grids, tables may store data on energy production, consumption, grid stability, and equipment status. These tables enable efficient management of energy distribution.

The system ability to retrieve and integrate data from these tables is essential for answering complex user questions that span multiple data sources.

Upon the successful generation of an answer to the complex question through the answer generation module 208, the multi-table question answering system ensures that the response is seamlessly delivered to the user. This vital interaction is facilitated through the GUI 110, providing a user-friendly platform for accessing and interacting with the answer.

Figure 3:
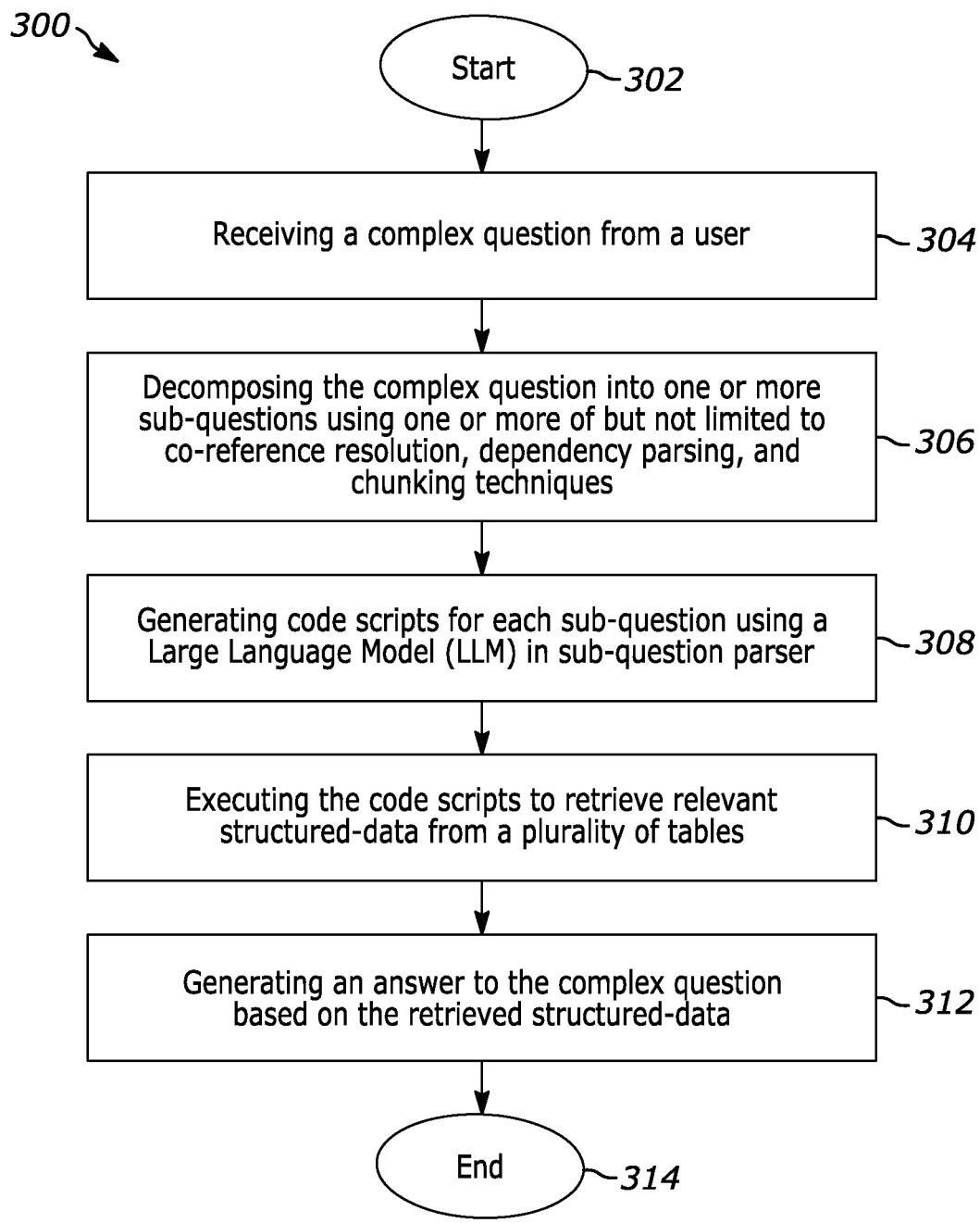
FIG. 3 illustrates a flow diagram of a method for multi-table question answering, in accordance with an example embodiment.

FIG. 3 illustrates a flow diagram of a method 300 for multi-table question answering, in accordance with an example embodiment. It will be understood that each block of the flow diagram of the method 300 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 106 of the question answering device 102, employing an embodiment of the present disclosure and executed by a processor 108. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

The method 300 illustrated by the flow diagram of FIG. 3 for multi-table question answering may start at step 302. Further, the method 300 may include receiving a complex question from a user, at step 304.

The method 300, at step 306, may include decomposing the complex question into one or more sub-questions using one or more of but not limited to techniques such as coreference resolution, dependency parsing, chunking and prompts. The one or more sub-questions may be in natural language.

At step 308, the method 300 may include generating code scripts for each sub-question using a Large Language Model (LLM) in sub-question parser. These code scripts are vital for retrieving the relevant structured data from the database. The generation process is facilitated by the LLM, which interprets the sub-questions and formulates the corresponding code scripts. These scripts are designed to access the necessary data from the database efficiently and effectively. In an embodiment, the code scripts may be formulated directly from the natural language sub-questions without any intermediary steps.

Once the code scripts have been generated, at step 310, the method 300 may further include executing the code scripts to retrieve relevant structured-data from a plurality of tables. This retrieval process is essential for collecting the necessary information that may ultimately contribute to formulating an accurate answer to the original complex question posed by the user.

At step 312, the method 300 may include, generating an answer to the complex question based on the retrieved structured data. This answer may be formulated based on the retrieved structured data, which has been collected from various tables within the database. By considering the information gathered, the method 300 produces a well-informed response that directly addresses the user's inquiry. Subsequently, method 300 terminates at step 314.

Figure 4:
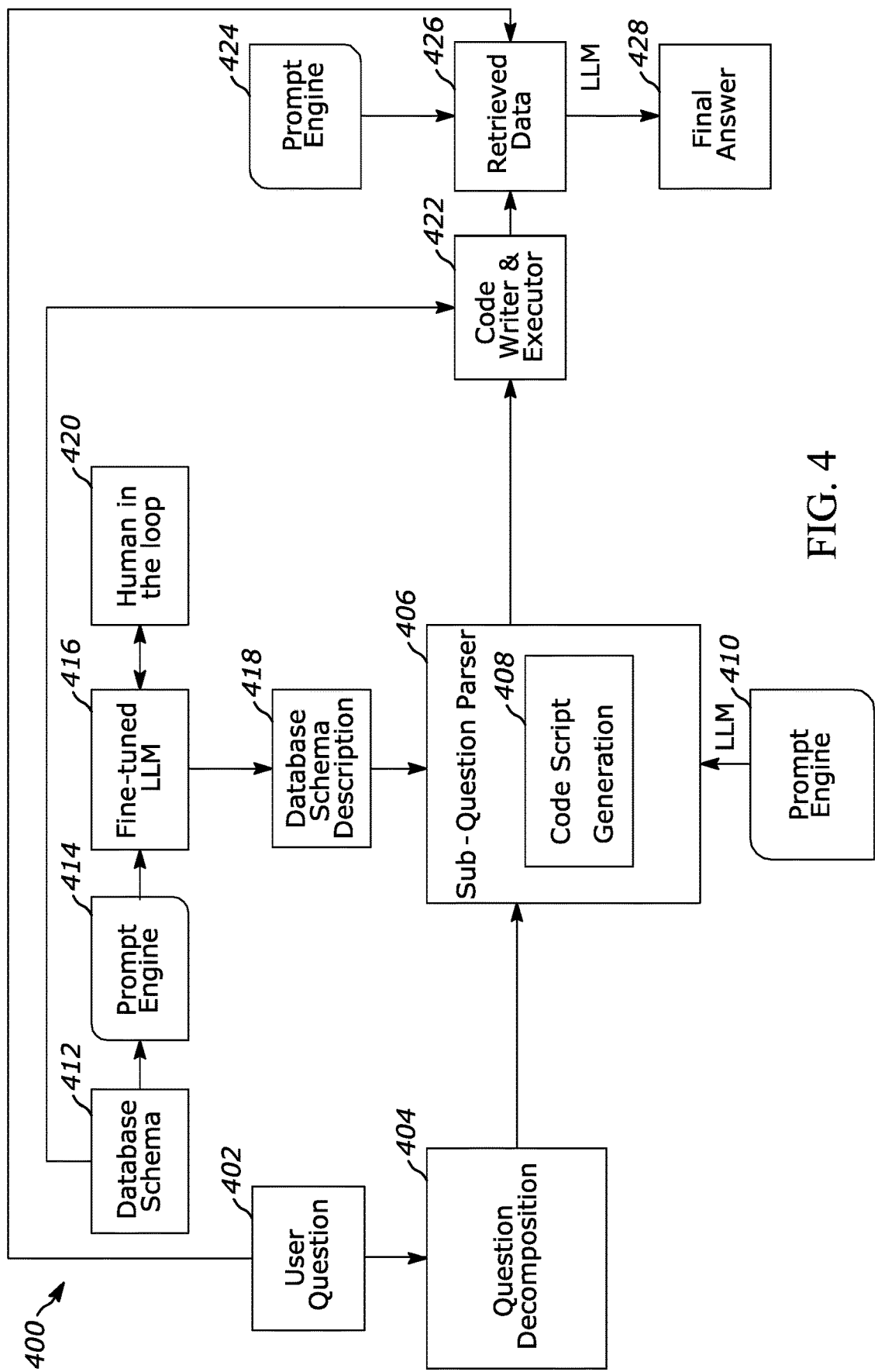
FIG. 4 illustrates a functional block diagram for multi-table question answering, in accordance with an example embodiment.

FIG. 4 illustrates a functional block diagram 400 for multi-table question answering, in accordance with an example embodiment. The process starts with user question 402, which represents the initial query provided by the user. This query is often complex and multi-faceted, encompassing various aspects and data sources. To break down the complexity of the user's query into manageable parts, the system relies on question decomposition block 404.

The question decomposition block 404 may employ techniques such as, but not limited to, coreference resolution, dependency parsing, chunking, and prompts to decompose user question 402 into sub-questions.

With the sub-questions decomposed, the system proceeds to load the database schema 412. The database represents a structured information, often spanning multiple tables, containing valuable data relevant to the user's query. To ensure a comprehensive understanding of the database's structure, the system incorporates a prompt generated by Prompt Engine 414. This prompt provides precise instructions to the LLM about the database's schema, encompassing details such as table names, column names, data types, and descriptions.

The fine-tuned LLM 416 employs Prompt Engine 818 to generate a database schema description 418. This description provides a structured overview of the database's organization, specifying key information for each table and column. The database schema description is formulated in a standardized format, typically including elements, such as Column Name|Data Type|Description, ensuring clarity and consistency. Human in loop 420 plays a critical role in enhancing accuracy and relevance. It encompasses human experts who validate and refine the system's understanding, particularly with regards to database schema descriptions. The database schema description 418 is then employed in sub-question parser 406 to provide a sense of database schema when generating code scripts. Within the sub-question parser 406, code script generation 408 is used to generate code scripts for each of the sub-questions, using guidance provided by a Prompt Engine 410. These code scripts serve as instructions for data retrieval and are carefully designed to extract necessary information from the database.

Following the code script generation 408, the system proceeds to a code writer & executor 422. It serves a dual purpose code writing and code execution. This component generates and executes code scripts that have been parsed and validated, effectively retrieving structured data from multiple tables within the database.

The retrieved data 426 represents the outcome of the data retrieval process. It represents information successfully retrieved from the database based on executed code scripts. This retrieved data forms the foundation for generating answers to user's questions. With retrieved data in hand, the system utilizes prompt engine 424. This prompt guides LLM in synthesizing comprehensive and context-aware responses. It provides instructions on how to create an answer that addresses user's query in a clear and informative manner. Finally, the process concludes in the final answer generation 428 representing the ultimate output of the system where a comprehensive and accurate answer to the user's complex question is generated. It combines the retrieved data, the contextual understanding derived from the user question, and the guidance from the prompt engine 424 to provide a valuable and user-centric response.

The complete process of multi-table question answering may be better explained with the help of an example:

In this example, the user is diagnosed with Rheumatoid arthritis and has an existing medical condition of Gout. The user seeks recommendations for medicines and doctors related to their conditions in a form of complex question: Hii, I am currently diagnosed with Rheumatoid arthritis and have an existing medical condition of Gout. What are the recommended medicines and doctors for me?

To tackle the complexity of the user's question the prompt engine serves as a guiding set of instructions for the system to break down the user's complex question into smaller, more manageable sub-questions. In this example, the user seeks recommendations for medications and doctors related to Rheumatoid arthritis and Gout, two medical conditions. The instructions are as follows:

Understanding the Dataframes: The first instruction emphasizes gaining a good understanding of the available dataframes and their corresponding columns, which represent separate tables with specific information related to healthcare entities in the database.

Selection of Dataframe and Columns: The second instruction directs the system to select the appropriate dataframes and columns that are necessary to solve each subtask effectively.

Retrieval of Relevant Information: The third instruction focuses on retrieving information that is highly relevant to addressing each subtask.

Code Writing: The fourth instruction mandates the writing of code (for example: Pandas code) for each subtask, ensuring that the solution relies on the code constraints (for example: pre-loaded dataframes and their columns, without altering letter cases).

Output Presentation: The fifth instruction dictates how the results should be presented, in a specific format that includes the subtask description and the corresponding code. The format should be like this: subtask 1: <subtask description>, code: <Pandas code for subtask 1>; subtask 2: <subtask description>, code: <Pandas code for subtask 2>; and so on.

In response to the user's complex question, the LLM generates a set of subtasks and their corresponding Pandas code to extract the necessary information from the database. By way of an example, the LLM may generate subtask 1: Retrieve the medications for Rheumatoid arthritis, and the corresponding Pandas Code: medications[medications[REASONDESCRIPTION]=='Rheumatoid arthritis']. In a similar way, the LLM may generate subtask 2: Retrieve the medications for Gout, and the corresponding Pandas Code: medications[medications[REASONDESCRIPTION]=='Gout']. Further, the LLM may generate subtask 3: Retrieve the doctors specializing in Rheumatology, and the corresponding Pandas Code: providers[providers['SPECIALITY']='Rheumatology']. Additionally, the LLM may generate subtask 4: Retrieve the doctors specializing in General Practice, and the corresponding Pandas Code: providers[providers['SPECIALITY']='General Practice']. The variables A, B, C, and D are used to store the outputs of the scripts for each subtask.

The prompt engine guides the LLM in utilizing the outputs of the sub-question scripts (A, B, C, and D) and the user's question to derive a final answer. It instructs the LLM to avoid displaying dataframe names directly and instead present the information contained within the dataframes.

Based on the execution of the code scripts corresponding to sub-questions and the information within the dataframes, the LLM generates a final answer for the user. In this example, the answer provides a list of recommended medications for Rheumatoid arthritis and Gout, along with the names of suitable doctors for the user's condition.

The answer may include: Based on your condition of Rheumatoid arthritis and Gout, the recommended medications for you are: Naproxen 500 MG Oral Tablet, Allopurinol 100 MG Oral Tablet, Colchicine 0.6 MG Oral Tablet, Methotrexate 2.5 MG Oral Tablet. To find a suitable doctor for your condition, you can refer to the following provider: John Smith, Thomas Shelby, or Otis Milburn.

The entire example showcases how the system examines a complex user question, retrieves relevant data, and presents a user-centric response, demonstrating the capabilities of the multi-table question answering system.

Figure 5A:
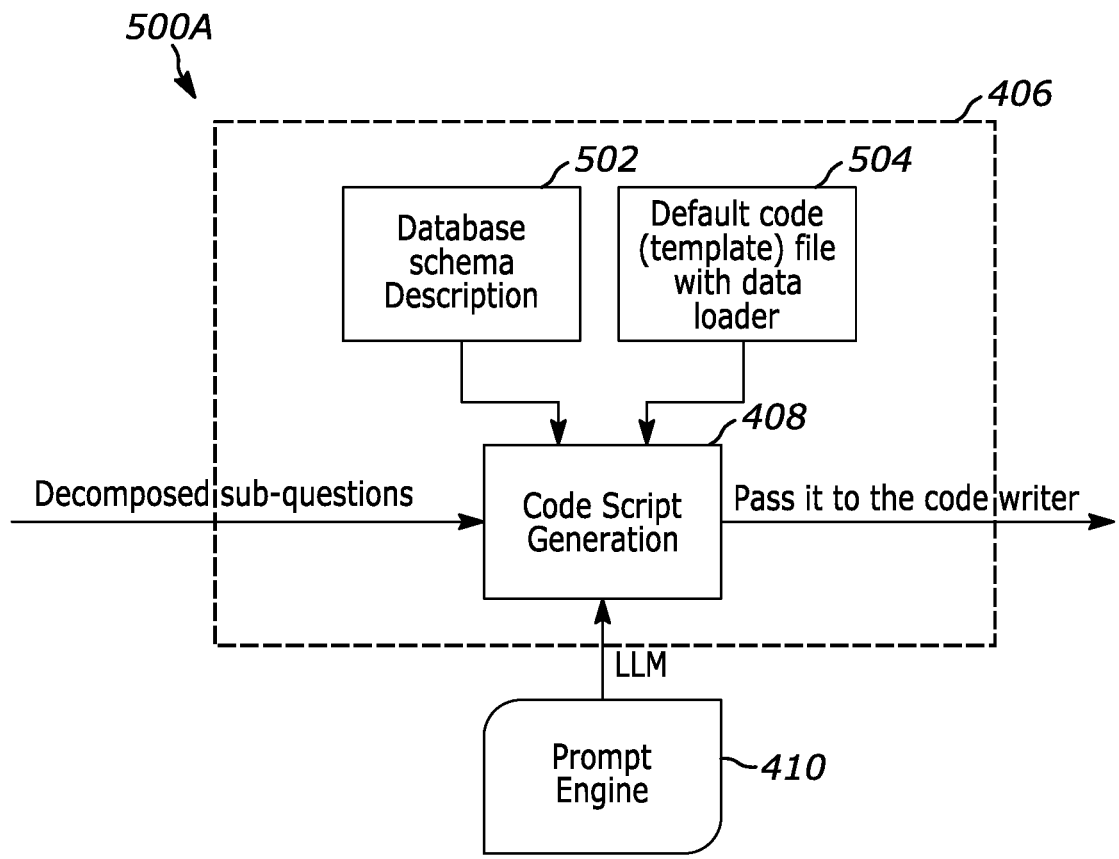
FIG. 5A is a functional block diagram of sub-question parser for directly converting one or more sub-questions to code scripts, in accordance with an example embodiment.

FIG. 5A is a functional block diagram 500A of sub-question parser 406 for directly converting one or more sub-questions to code scripts, in accordance with an example embodiment. The sub-question parser 406 is a crucial component within the multi-table question answering system, responsible for transforming sub-questions into a code script that may be further utilized within the system.

At the core of the sub-question parser 406 are components such as a database schema description 502, a default (template) code file with data loader 504, a code script generation 408 and a Prompt Engine 410 which serves as the input source for generating code scripts. The database schema description 502 includes essential information about the structure and organization of the data relevant to the multi-table question answering system. It provides a schema for understanding the database tables, columns, and relationships.

The default code (template) file with data loader 504 includes a default code file that serves as a template for generating code scripts. It also incorporates a data loader, which is responsible for handling and loading the database. This combination ensures that the code scripts are properly structured and may interact with the database effectively.

The Prompt Engine 410 serves as a bridge between the natural language sub-questions and the code generation process. It provides instructions and guidance for converting the sub-questions, expressed in human language, into code scripts, which are understandable by the system.

Therefore, in order to generate the code scripts, initially the sub-questions that have been previously decomposed from the complex user question is input to the sub-question parser 406. Within the sub-question parser 406, the decomposed sub-questions are processed in conjunction with the database schema description 502, the default code (template) file with data loader 504, and the Prompt Engine 410. As a result, the code scripts are generated for each sub-question, converting them from natural language into executable code.

Finally, the generated code scripts are passed to the code writer component for further utilization within the system. The code writer component ensures that these scripts are correctly formatted, structured, and ready for execution.

Figure 5B:
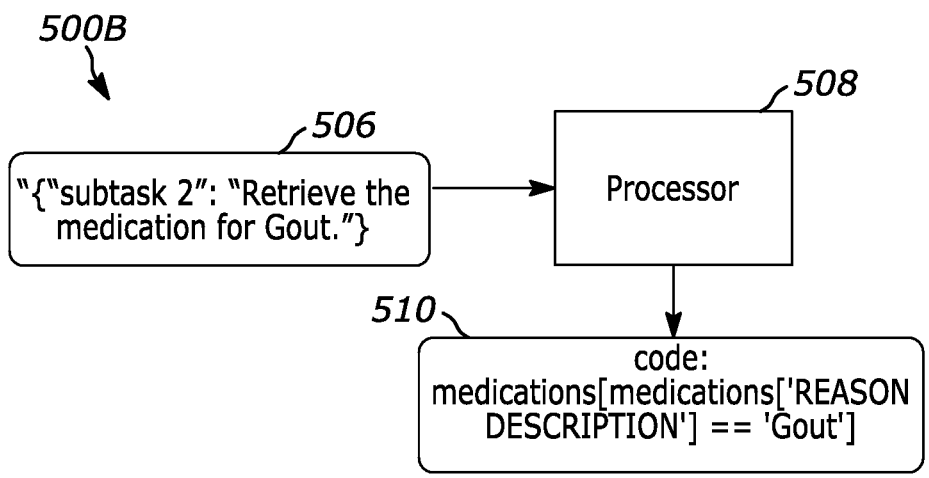
FIG. 5B illustrates an exemplary scenario for directly converting one or more sub-questions to code scripts, in accordance with an example embodiment.

FIG. 5B illustrates an exemplary scenario 500B for directly converting one or more sub-questions to code scripts, in accordance with an example embodiment. The sample data structure denoted as {"subtask 2": "Retrieve the medication for Gout."} 506. This structure consists of a key-value pair, where "subtask 2" serves as the key, and "Retrieve the medication for Gout." is the corresponding value. This structure essentially encapsulates a sub-question in natural language.

The sample data structure is then passed to the "Direct Code Script Generation" component 508. Within this component, the sub-question expressed in the data structure is processed to directly generate a code script that corresponds to the sub-question. In this case, the code script generated may focus on retrieving medication related to "Gout."

The output from the "Direct Code Script Generation" component 508 is presented in the form of another data structure. This data structure consists of a key, which is "code," and a corresponding value. The value represents the code script that has been generated based on the sub-question. For example, key: "code" indicates that the value represents a code script and value: "medications[medications[REASONDESCRIPTION]=='Gout']"} 510 signifies the specific code script generated to retrieve medication information related to "Gout" from the database. This structured output is then made available for execution, contributing to the multi-table question answering process.

Figure 6:
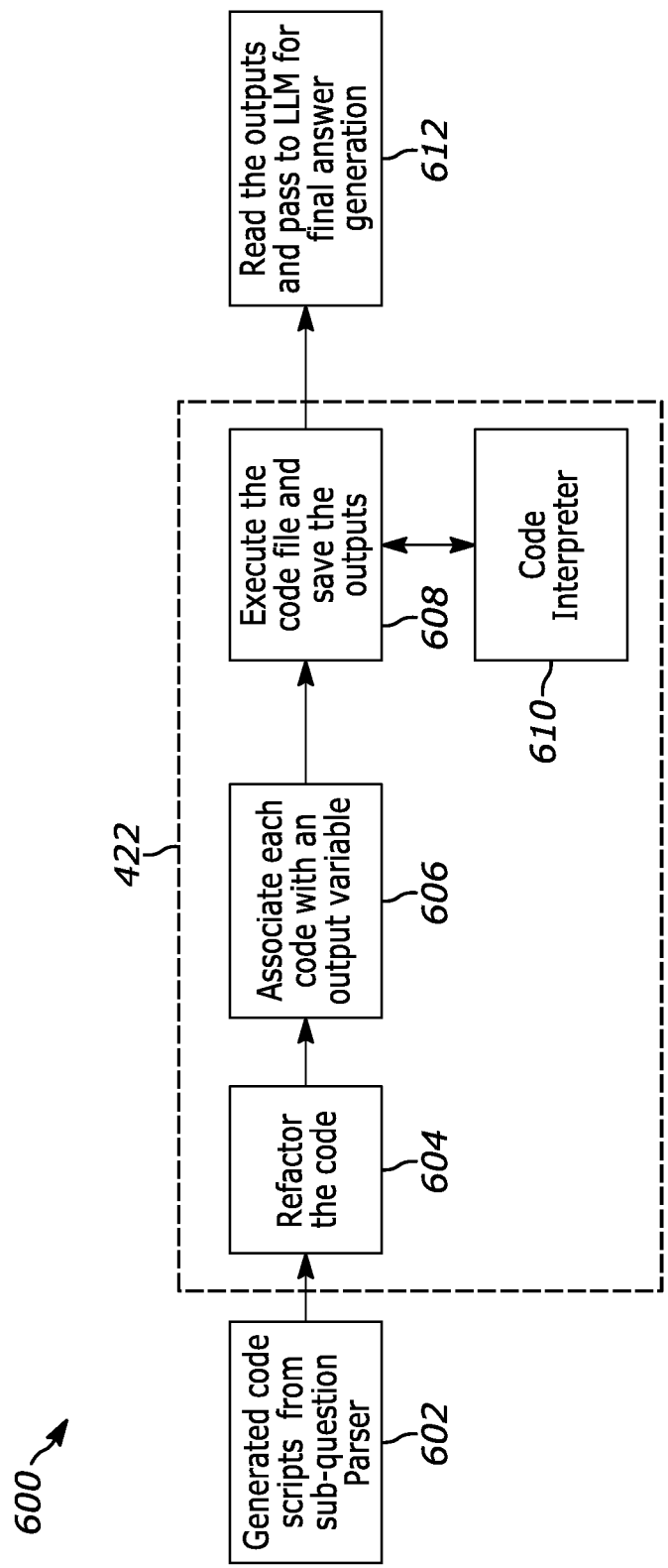
FIG. 6 is a functional block diagram of code writer and executer, in accordance with an example embodiment.

FIG. 6 is a functional block diagram 600 of the code writer and executor 422, in accordance with an example embodiment. In particular, the block diagram 600 shows the stages involved in executing code scripts generated by the LLM and managing their outputs. This process is involved in handling and executing code scripts generated by the LLM, contributing to the generation of final answers.

The process commences with the Generated code scripts from "sub-question Parser" component 602. These code scripts are generated by the LLM as part of the multi-table question answering workflow. They represent a series of instructions that, when executed, retrieve relevant data from multiple tables.

The next phase involves optimization or restructuring of the generated code scripts to ensure they are efficient and well-organized. This is achieved through the "Refactor the code" component 604. The component 604 may involve improving readability, performance, or overall code quality.

Subsequently, each code script is associated with an output variable. The "Associate each code with an output variable" component 606 plays a crucial role in this step. This association allows for the tracking and management of outputs generated by the execution of each code script.

The core execution of the code scripts takes place in the "Execute the code file and save the outputs" component 608. This component 608 helps in the execution of the code scripts contained in the default code file. As a result of this execution, outputs are generated, capturing relevant data from the multiple tables using the "code interpreter" 610.

Once the code file is executed, it goes to the "Read the outputs and pass to LLM for final answer generation" component 612. This component 612 plays a critical role in facilitating the seamless flow of data between the code execution process and the subsequent stages of final answer generation, ensuring that the executed code's outcomes are utilized effectively.

Figure 7:
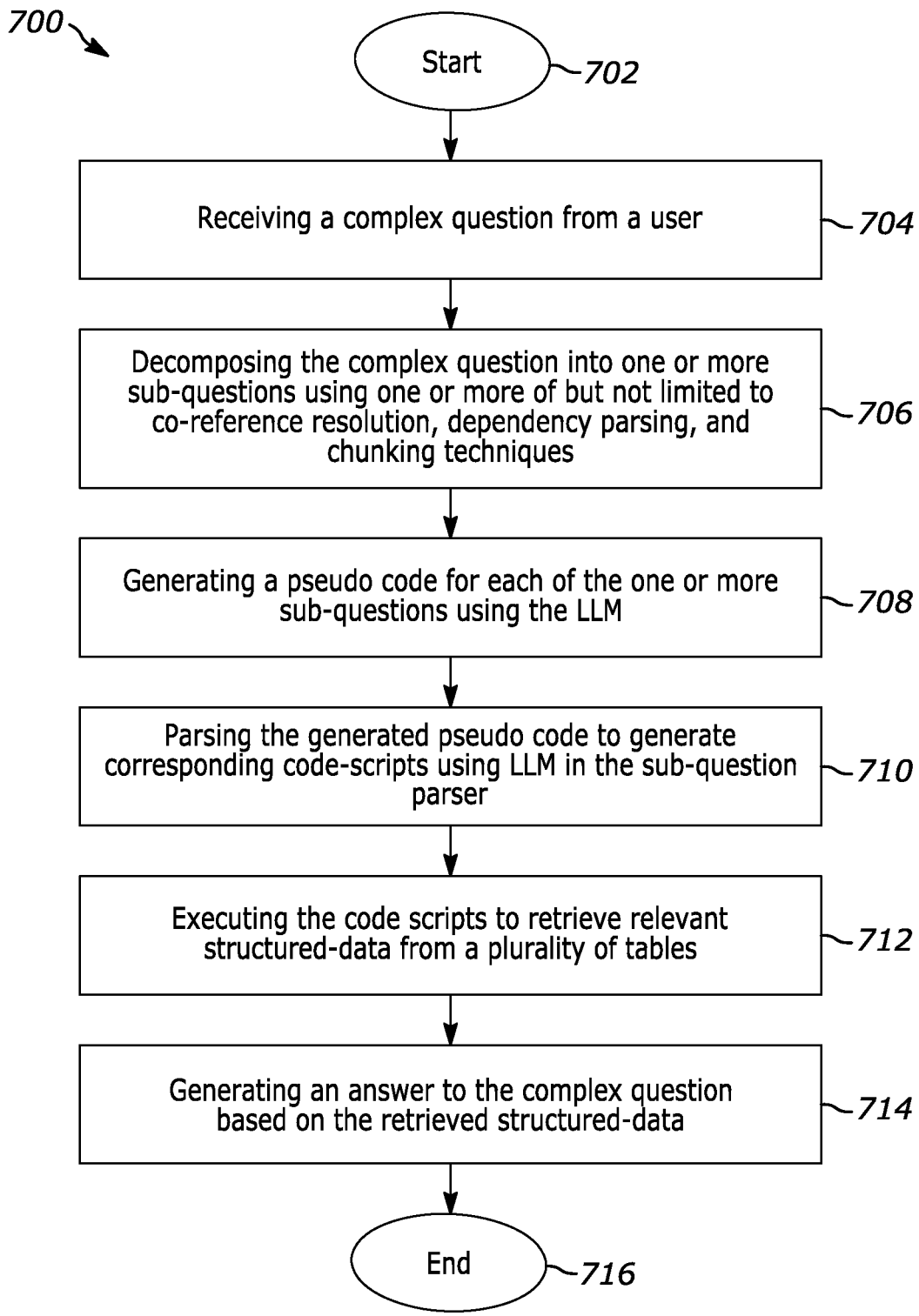
FIG. 7 illustrates a flow diagram of a method for multi-table question answering based on pseudo-code generation, in accordance with an example embodiment.

FIG. 7 illustrates a flow diagram of a method 700 for multi-table question answering based on pseudo-code generation, in accordance with an example embodiment. It will be understood that each block of the flow diagram of method 700 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 106 of the question answering device 102, employing an embodiment of the present disclosure and executed by a processor 108. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

FIG. 7 is explained in conjunction with elements from FIGS. 1, 2, 3, 4, 5, and 6. At step 702, the method 700 is initiated. The method 700 at step 704, may include receiving a complex question from a user.

The method 700, at step 706, may include decomposing the complex question into one or more sub-questions using one or more of but not limited to techniques such as coreference resolution, dependency parsing, chunking and prompts. These techniques help break down the original question into smaller, more manageable parts. The one or more sub-questions may be in natural language.

At step 708, the method 700 may include generating a pseudo code for each of the one or more sub-questions using an LLM. The term "pseudo-code" refers to a high-level, human-readable representation of code that conveys the logic and steps required to perform a specific task without being written in an actual programming language. Pseudo-code is often used as an intermediate step before generating actual executable code.

After generating pseudo-code for all sub-questions, at step 710, the method 700 may include, parsing the generated pseudo to generate corresponding code-scripts using LLM in the sub-question parser. In an embodiment, the one or more sub-questions are not directly converted to code script. In particular, the one or more sub-questions are first converted to pseudo-code and then to code script. This makes it easier for developers and domain experts to review and understand the steps involved in answering each sub-question. It acts as an intermediate, abstract representation that helps in communication between domain experts and developers.

In short, converting sub-questions to pseudo-code before generating code scripts offers advantages in terms of clarity, validation, customization, and flexibility. It enhances the overall quality and maintainability of the code, particularly when dealing with complex multi-table question-answering tasks.

Once the corresponding code-scripts are generated, at step 712, the method 700 may further include executing the code scripts to retrieve relevant structured-data from a plurality of tables. This retrieval process is essential for collecting the necessary information that may ultimately contribute to formulating an accurate answer to the original complex question posed by the user.

At step 714, the method 700 may include, generating an answer to the complex question based on the retrieved structured data. This answer may be formulated based on the retrieved structured data, which has been collected from various tables within the database. By considering the information gathered, the method 700 produces a well-informed response that directly addresses the user's inquiry. Subsequently, the method 700 terminates at step 716.

Figure 8:
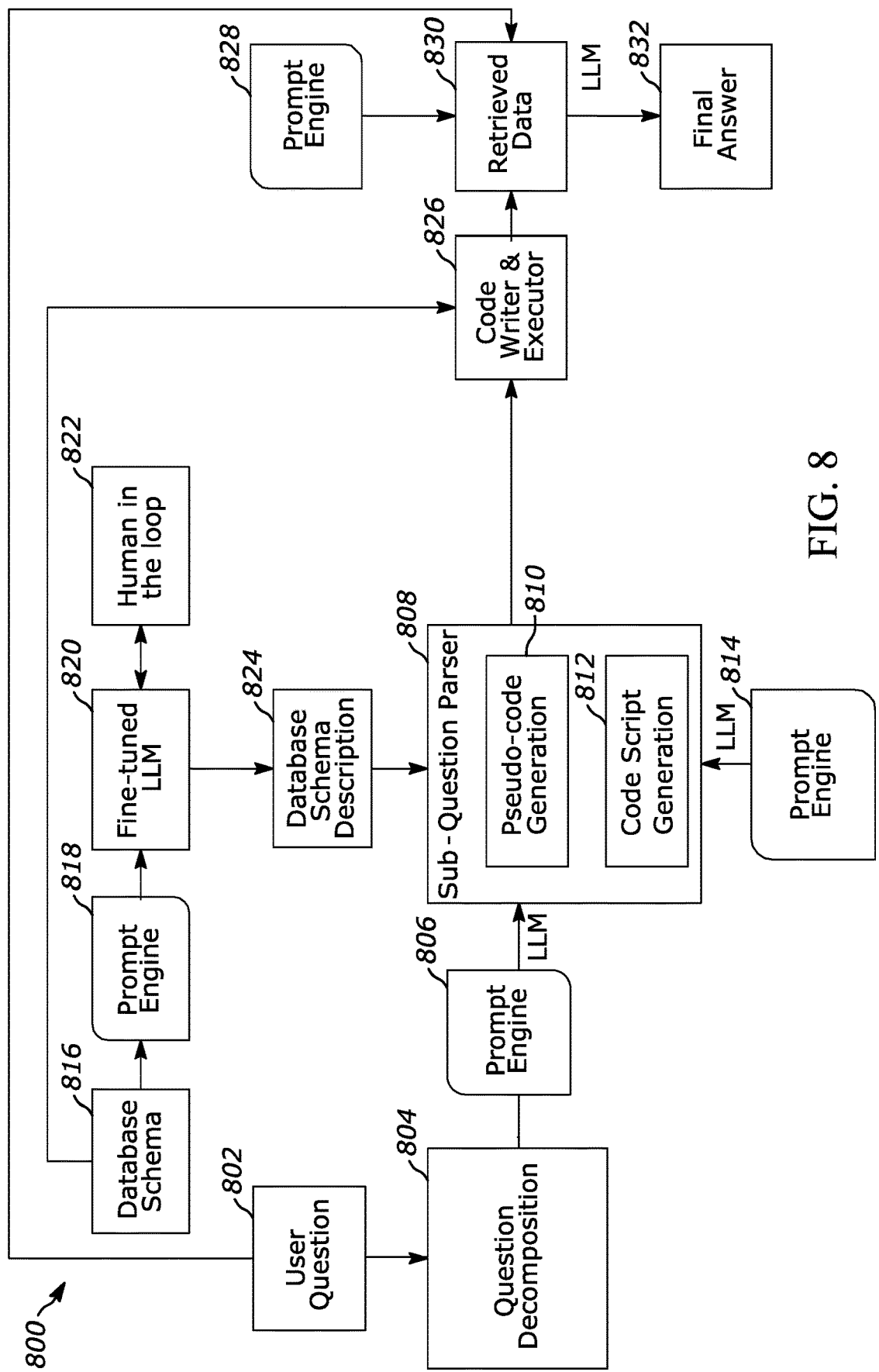
FIG. 8 illustrates a functional block diagram for multi-table question answering based on pseudo-code generation, in accordance with an example embodiment.

FIG. 8 illustrates a functional block diagram 800 for multi-table question answering based on pseudo-code generation, in accordance with an example embodiment. The process starts with user question 802, which represents the initial query provided by the user. This query is often complex and multi-faceted, encompassing various aspects and data sources. To break down the complexity of the user's query into manageable parts, the system relies on question decomposition block 804.

The question decomposition block 804 may employ techniques such as, but not limited to, coreference resolution, dependency parsing, chunking, and prompts to decompose user question 802 into sub-questions.

With the sub-questions decomposed, the system proceeds to load the database schema 816. The database represents a structured repository of information, often spanning multiple tables, containing valuable data relevant to the user's query. To ensure a comprehensive understanding of the database's structure, the system incorporates a prompt generated by Prompt Engine 818. This prompt provides precise instructions to the LLM about the database's schema, encompassing details such as table names, column names, data types, and descriptions.

The fine-tuned LLM 820 employs Prompt Engine 818 to generate a database schema description 824. This description provides a structured overview of the database's organization, specifying key information for each table and column. The database schema description is formulated in a standardized format, typically including elements, such as Column Name|Data Type|Description, ensuring clarity and consistency. Human in loop 822 plays a critical role in enhancing accuracy and relevance. It encompasses human experts who validate and refine the system's understanding, particularly with regards to database schema descriptions. The database schema description 824 is then employed in sub-question parser 808 to provide a sense of database schema when generating pseudo code and code scripts.

Within sub-question parser 808, two important sub-blocks come into play: pseudo-code generation 810 and code script generation 812 using the LLM. The first sub-block utilizes the guidance provided by a prompt engine 806 to generate pseudo-code for each of the sub-questions. Once the pseudo-code is generated for each sub-question, the LLM's second function activates. It generates code scripts for each pseudo-code using guidance provided by a Prompt Engine 814. These code scripts serve as instructions for data retrieval and are carefully designed to extract necessary information from the database.

Following the code script generation 812, the system proceeds to a code writer & executor 826. It serves a dual purpose: code writing and code execution. This component refactors and executes code scripts that have been validated, effectively retrieving structured data from multiple tables within the database.

The retrieved data 830 represents the outcome of the data retrieval process. It represents information successfully retrieved from the database based on executed code scripts. This retrieved data forms the foundation for generating answers to user's questions. With retrieved data in hand, the system utilizes a prompt generated by Prompt Engine 828. This prompt guides LLM in synthesizing comprehensive and context-aware responses. It provides instructions on how to create an answer that addresses the user's query in a clear and informative manner. Finally, the process concludes in the final answer generation 832 representing the ultimate output of a system where a comprehensive and accurate answer to the user's complex question is generated. It combines the retrieved data, the contextual understanding derived from the user question, and the guidance from the Prompt Engine 828 to provide a valuable and user-centric response.

The complete process of multi-table question answering based on pseudo-code generation may be explained with the help of earlier example as described in FIG. 4.

In response to the user's complex question: Hii, I am currently diagnosed with Rheumatoid arthritis and have an existing medical condition of Gout. What are the recommended medicines and doctors for me?. the LLM generates a set of subtasks and their corresponding pseudo-code to extract the necessary information from the database.

By way of an example, the LLM may generate subtask 1 which includes: Retrieve the medications for Rheumatoid arthritis, and the corresponding Pseudo-Code: Retrieve a subset of medications where the 'REASONDESCRIPTION' is "Rheumatoid arthritis". Further, the LLM may generate subtask 2: Retrieve the medications for Gout, and the corresponding Pseudo-Code: Retrieve a subset of medications where the 'REASONDESCRIPTION' is 'Gout'. Further, the LLM may generate subtask 3: Retrieve the doctors specializing in Rheumatology, and the corresponding Pseudo-Code: Retrieve a subset of providers where the 'SPECIALITY' is 'Rheumatology'. Additionally, Further, the LLM may generate subtask 4: Retrieve the doctors specializing in General Practice, and the corresponding Pseudo-Code: Retrieve a subset of providers where the 'SPECIALITY' is 'General Practice'.

The variables A, B, C, and D are used to store the outputs of the scripts for subtask 1, subtask 2, subtask 3 and subtask 4.

The Prompt Engine guides the LLM in utilizing the outputs of the sub-question scripts (A, B, C, and D) and the user's question to derive a final answer. It instructs the LLM to avoid displaying dataframe names directly and instead present the information contained within the dataframes.

Based on the execution of the code scripts corresponding to sub-questions and the information within the dataframes, the LLM generates a final answer for the user. In this example, the answer provides a list of recommended medications for Rheumatoid arthritis and Gout, along with the names of suitable doctors for the user's condition. The answer may include: Based on your condition of Rheumatoid arthritis and Gout, the recommended medications for you are: Naproxen 500 MG Oral Tablet, Allopurinol 100 MG Oral Tablet, Colchicine 0.6 MG Oral Tablet, and Methotrexate 2.5 MG Oral Tablet. To find a suitable doctor for your condition, you can refer to the following provider: John Smith, Thomas Shelby, or Otis Milburn.

The entire example showcases how the system examines a complex user question, retrieves relevant data, and presents a user-centric response, demonstrating the capabilities of the multi-table question answering system based on pseudo-code generation.

Figure 9A:
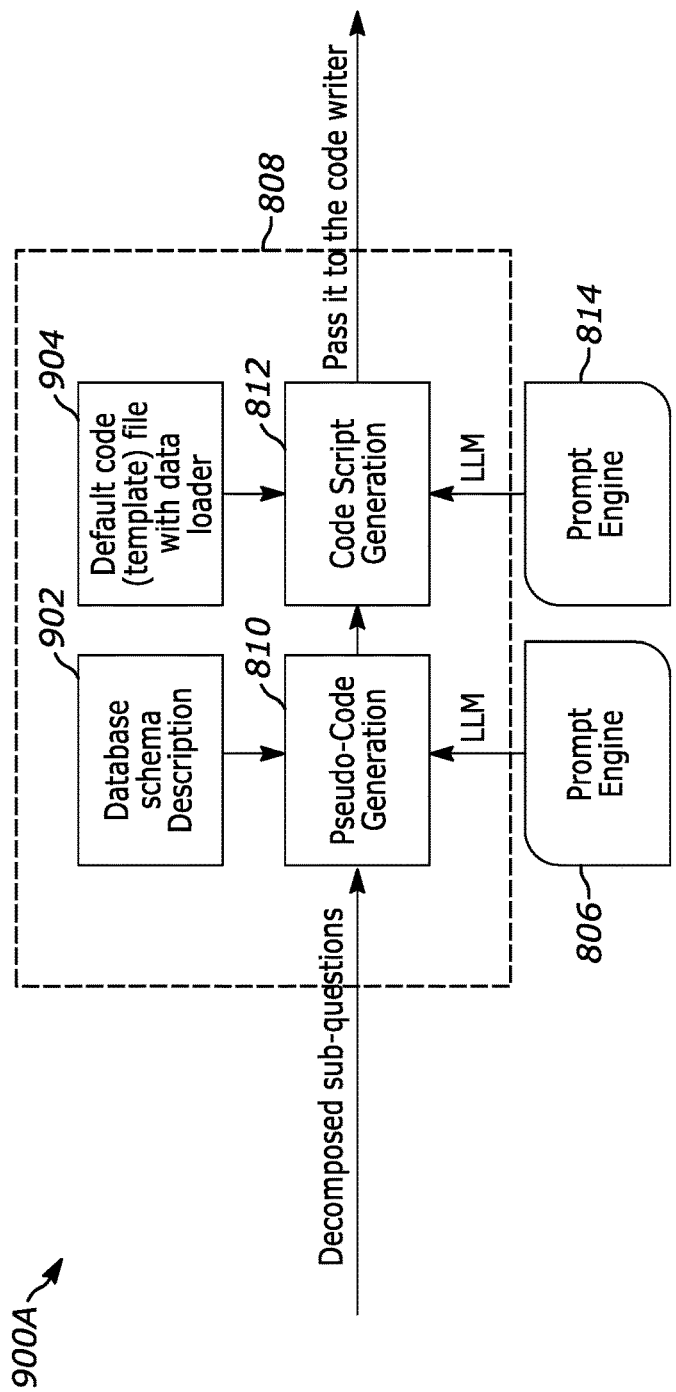
FIG. 9A is a functional block diagram of sub-question parser for converting one or more sub-questions to code scripts based on generated pseudo code, in accordance with an example embodiment.

FIG. 9A is a functional block diagram 900A of sub-question parser 808 for converting one or more sub-questions to code scripts based on generated pseudo code, in accordance with an example embodiment. The process begins with the decomposed sub-questions. These sub-questions have been generated from the user's complex query and serve as the basis for further data retrieval and processing.

The sub-question parser 808 relies on a database schema description 902 (containing metadata and description) to understand the structure and organization of the database. This schema provides essential information about table names, column names, data types, and descriptions.

To guide the generation of pseudo-code from the sub-questions, a Prompt Engine 806 is used. This Prompt Engine offers instructions to the LLM on how to create pseudo-code that aligns with the intent of each sub-question.

Within the sub-question parser 808, the block Pseudo-Code Generation 810 retrieves or generates pseudo-code for each sub-question based on the instructions from the Prompt Engine 806. The generated pseudo-code serves as a high-level representation of how to extract relevant data from the database to answer each sub-question.

Once the pseudo-code is obtained, it is structured and combined with a default code template. The default code (template) file with data loader 904 contains code snippets that facilitate data loading and manipulation tasks.

A Prompt Engine 814 is employed to instruct the system on how to translate the pseudo-code into code scripts that may be executed for data retrieval.

The pseudo-code pieces, along with the instructions from the Prompt Engine 814 are processed to generate specific code scripts 812 for each sub-question. These code scripts act as executable instructions for extracting data relevant to each sub-question.

The final output of this process is a set of code scripts tailored to each sub-question. These code scripts are passed to the code writer component for execution and data retrieval, forming a critical part of the multi-table question answering system.

Figure 9B:
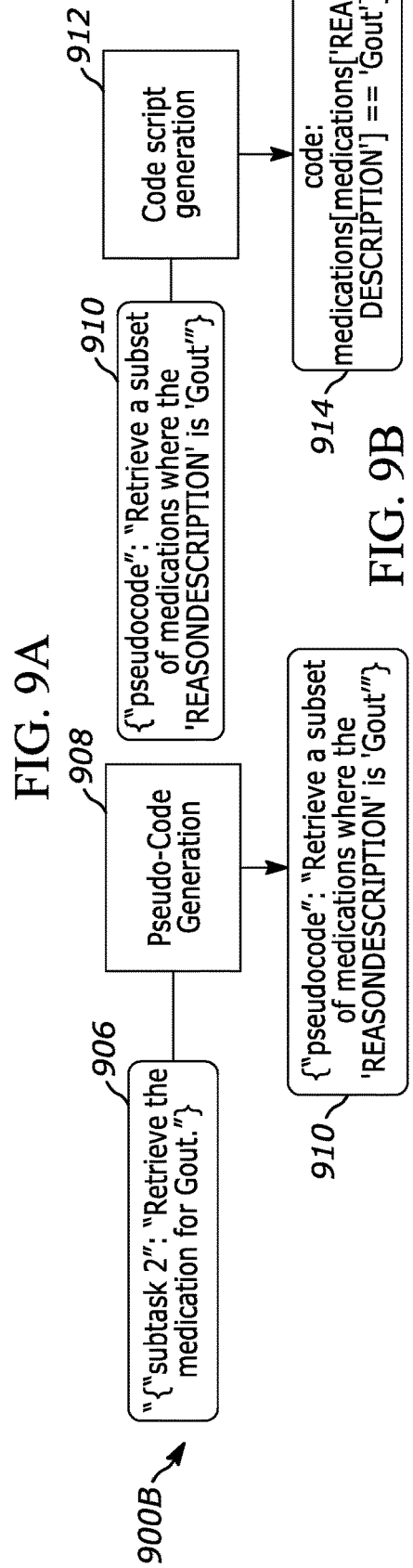
FIG. 9B illustrates an exemplary scenario for converting one or more sub-questions to code scripts based on generated pseudo code, in accordance with an example embodiment.

FIG. 9B illustrates an exemplary scenario 900B for converting one or more sub-questions to code scripts based on generated pseudo code, in accordance with an example embodiment. The process start with a sample data denoted as {"subtask 2": "Retrieve the medication for Gout."} 906 is input to "pseudo-code generation 908" component.

The output of the "pseudo-code generation 908" component is {"pseudocode": "Retrieve a subset of medications where the 'REASONDESCRIPTION' is 'Gout'"} 910. The generated pseudo-code captures the essence of the sub-task and how it should be executed to retrieve relevant data.

The generated pseudo-code, now represented as {"pseudocode": "Retrieve a subset of medications where the 'REASONDESCRIPTION' is 'Gout'"} 910, is passed to the Code Script Generation component 912. Here, the system interprets the pseudo-code and transforms it into a specific code script. In this instance, the output of this step is {"code: medications[medications['REASONDESCRIPTION']= 'Gout']"} 914. This code script is designed to query a database (likely a table named 'medications') and extract data where the 'REASONDESCRIPTION' matches 'Gout'.

This scenario illustrates how a sub-question, represented by the sample data, is transformed into a code script through a two-step process. First, the sub-question is converted into pseudo-code, which serves as a high-level description of the desired data retrieval. Then, this pseudo-code is further translated into a precise code script that may be executed within the multi-table question answering system to retrieve the relevant data, all while maintaining the context and intent of the original sub-question.

Figure 10:
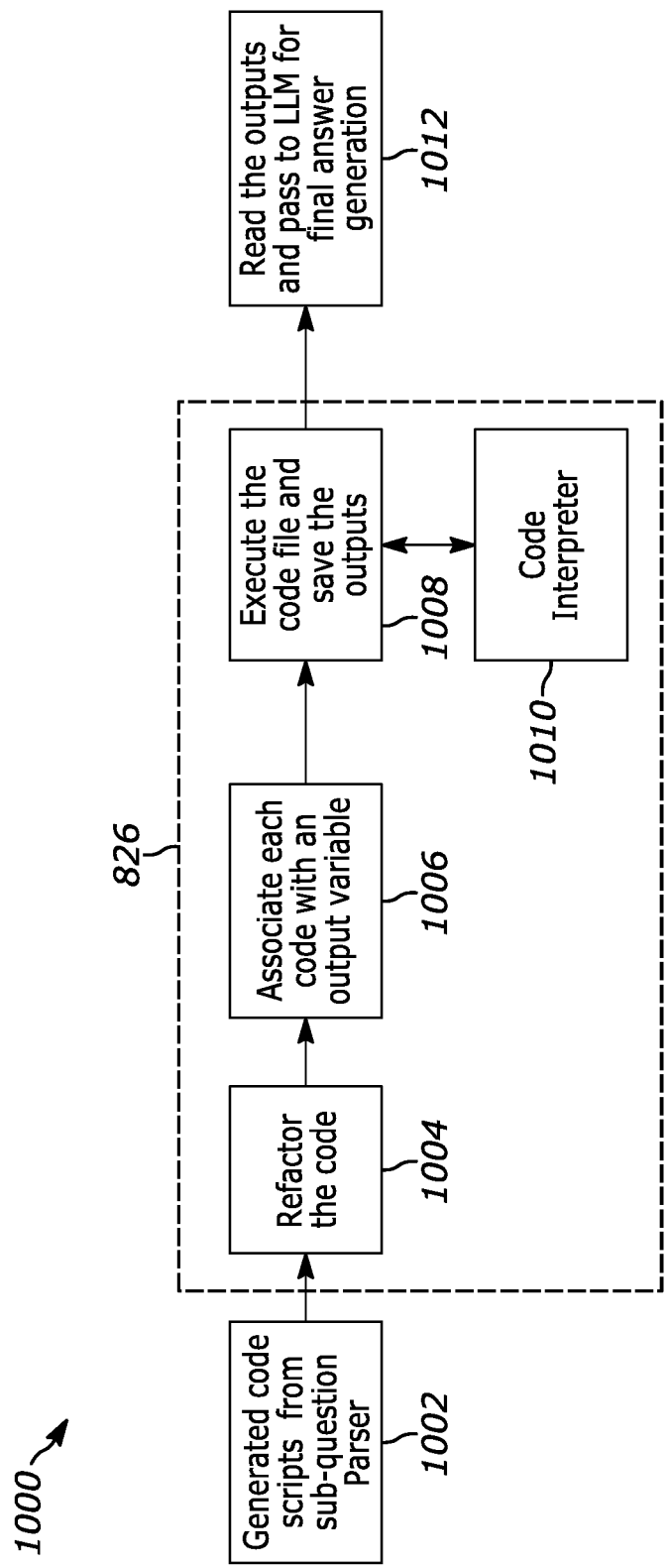
FIG. 10 illustrates a functional block diagram of the code writer and executer, in accordance with an example embodiment.

FIG. 10 is a functional block diagram 1000 of the code writer and executer 826, in accordance with an example embodiment. In particular, the block diagram 1000 shows the stages involved in executing code scripts generated by the LLM and managing their outputs. This process is involved in handling and executing code scripts generated by the LLM, contributing to the generation of final answers.

The process commences with the Generated code scripts from sub-question Parser component 1002. These code scripts are generated by the LLM as part of the multi-table question answering workflow. They represent a series of instructions that, when executed, retrieve relevant data from multiple tables.

The next phase involves optimization or restructuring of the generated code scripts to ensure they are efficient and well-organized. This is achieved through the Refactor the code component 1004. The component 1004 may involve improving readability, performance, or overall code quality.

Subsequently, each code script is associated with an output variable. The Associate each code with an output variable component 1006 plays a crucial role in this step. This association allows for the tracking and management of outputs generated by the execution of each code script.

The core execution of the code scripts takes place in the Execute the code file and save the outputs component 1008. This component 1008 helps in the execution of the code scripts contained in the default code file. As a result of this execution, outputs are generated, capturing relevant data from the multiple tables.

The output of this execution is branched into two directions. The first branch leads to the Code Interpreter' component 1010, which interprets the executed code and processes it further, contributing to the overall functionality of the system.

The second branch directs the output to the Read the outputs and pass to LLM for final answer generation component 1012. This component 1012 plays a critical role in facilitating the seamless flow of data between the code execution process and the subsequent stages of final answer generation, ensuring that the executed code's outcomes are utilized effectively.

Figure 11:
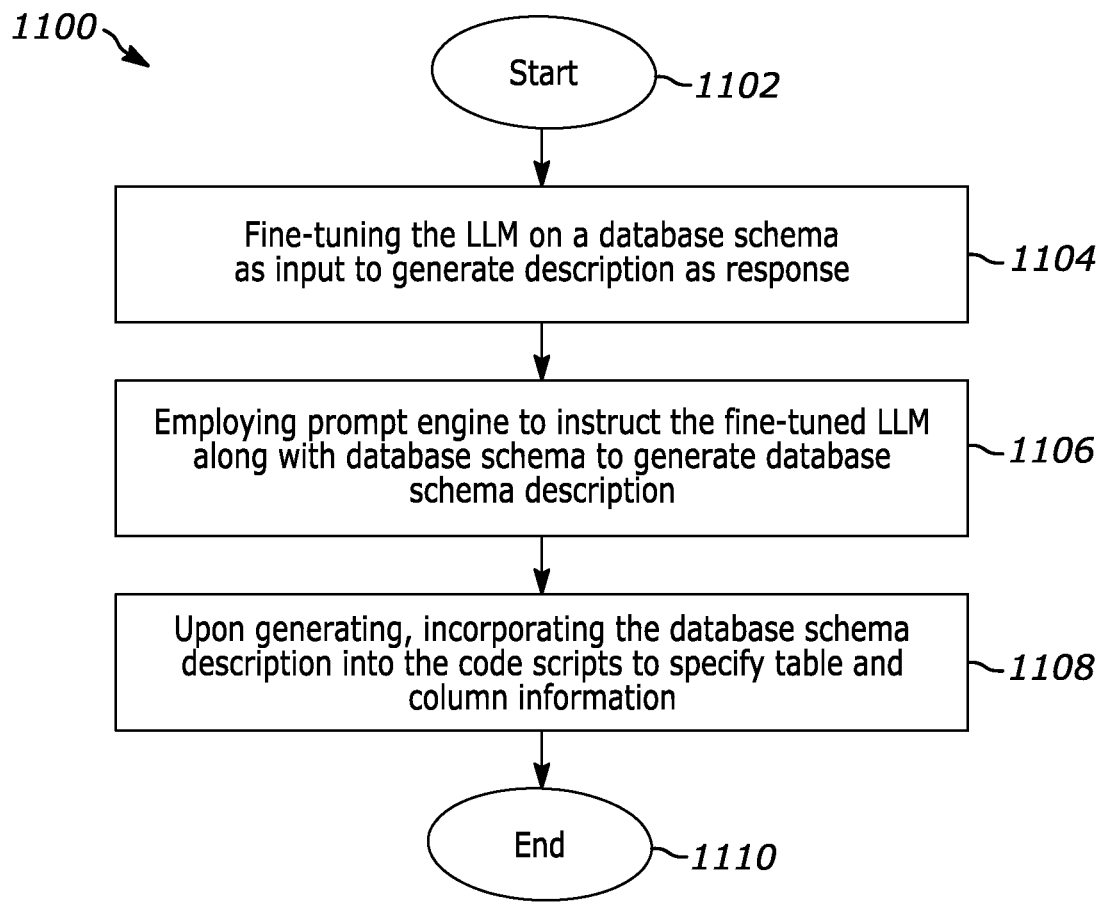
FIG. 11 illustrates a flow diagram of a method for generating a database schema description, in accordance with an example embodiment.

FIG. 11 illustrates a flow diagram of a method 1100 for generating a database schema description, in accordance with an example embodiment. It will be understood that each block of the flow diagram of the method 1100 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 106 of the question answering device 102, employing an embodiment of the present disclosure and executed by a processor 108. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

FIG. 11 is explained in conjunction with elements from FIGS. 1, 2, 3, 4, 5, 6, 7, 8, 9, and 10. At step 1102, the method 1100 is initiated. The method 1100 at step 1104, may include fine-tuning the LLM on a database schema as input to generate schema description as response. By fine-tuning on domain-specific data, the LLM gains knowledge and expertise related to the specific subject matter. In healthcare, for instance, the model may learn medical terminology, understand context-specific nuances, and generate more accurate responses.

The method 1100 at step 1106, may include employing Prompt Engine to instruct the fine-tuned LLM along with database schema to generate database schema description. This prompt serves as the initial instruction to guide the fine-tuned LLM on database schema. The prompt typically includes details and guidelines for the LLM to follow when creating this schema description.

This dynamic approach ensures that the database schema description remains adaptable and responsive to changes in the external descriptions. Each table and column's description are considered, and the LLM formats the schema in a structured manner, typically in the format: "Column Name-|Data Type|Description". This format provides a clear representation of the database structure, with each column's name, data type, and its corresponding description.

The method 1100, at step 1108 may further include incorporating the database schema description while generating the code scripts. This incorporation is essential as it imparts valuable information about the database structure to the code scripts. Specifically, the dynamically generated schema description, with its detailed column information, is used to specify details about the tables and columns present within the database. By including this information, the code scripts become more contextually aware and may effectively access the relevant data required to answer the user's complex question.

The dynamic nature of the schema description ensures that it remains up-to-date and aligned with any changes or updates in the external descriptions for tables and columns. This adaptability enhances the accuracy and relevance of the code scripts in retrieving data from the database. Finally, the method 1100 terminated at step 1110.

The method 1100 for generating a database schema description is further explained with the help of an example. In this instance, consider a database related to healthcare providers, specifically doctors, with attributes like name, gender, specialization, and location information. The database information is initially presented in a simplified form as follows: Original Database Information: descriptions="""'providers consist of doctor information'""". Original Database Information: db_info="""'providers: ['Id', 'ORGANIZATION', 'NAME', 'GENDER', 'SPECIALITY', 'ADDRESS', 'CITY', 'STATE', 'ZIP', 'LAT', 'LON', 'UTILIZATION']'""".

The process begins with a Prompt Engine, which instructs the system to add descriptions to the existing database information and restructure it into a standardized format containing columns' names, data types, and descriptions. The prompt may be formulated as follows: Add {descriptions} to {db_info} and Restructure it into (Column Name-|Data Type|Description) format.

Following the Prompt Engine, the system generates a comprehensive database schema description, transforming the initial database information into a well-defined structure that provides clarity and context.

The resulting schema description is structured as follows: Providers: —Id string|Unique identifier for the provider—ORGANIZATION|string|Unique identifier for the organization the provider belongs to—NAME|string|Name of the provider—GENDER|string|Gender of the provider—SPECIALITY|string| Speciality of the provider—ADDRESS|string|Address of the provider—CITY|string| City of the provider's location—STATE|string|State of the provider's location—ZIP| string|Zip code of the provider's location—LAT|decimal|Latitude of the provider's location—LON|decimal|Longitude of the provider's location—UTILIZATION| integer|Number of times the provider was utilized for medical treatment.

This generated schema description encapsulates essential information about the database structure, including column names, data types, and meaningful descriptions. It serves as a critical component in guiding subsequent steps within the multi-table question answering process, ensuring accurate and context-aware data retrieval and answer generation.

Figure 12:
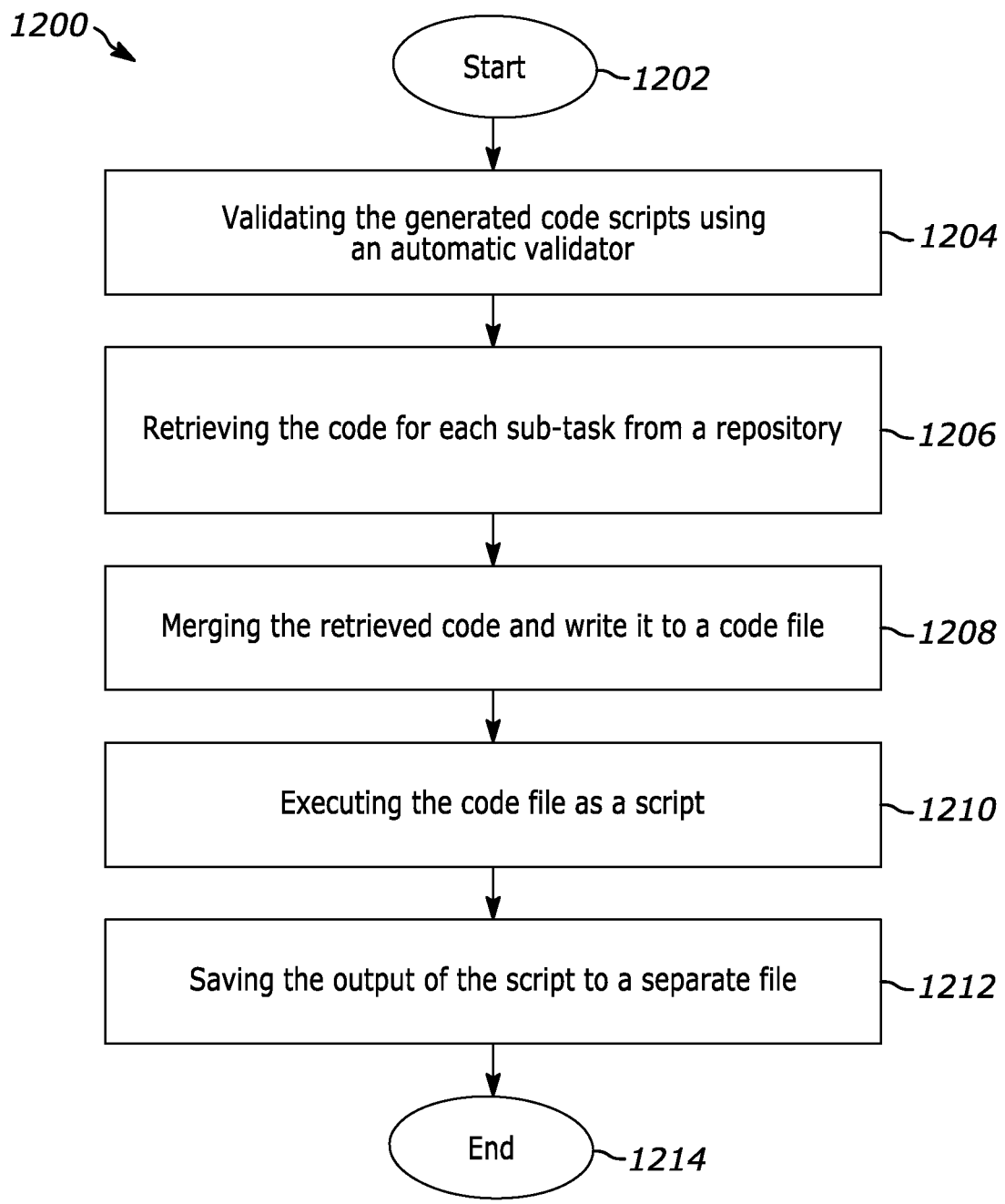
FIG. 12 illustrates a flow diagram of a method for executing generated code scripts, in accordance with an example embodiment.

FIG. 12 illustrates a flow diagram of a method 1200 for executing generated code scripts, in accordance with an example embodiment. It will be understood that each block of the flow diagram of the method 1200 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 106 of the question answering device 102, employing an embodiment of the present disclosure and executed by a processor 108. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

FIG. 12 is explained in conjunction with elements from FIGS. 1, 2, 3, 4, 5, 6, 7, 8, 9, 10, and 11. As mentioned earlier in FIG. 8, the code scripts may be executed using a code writer and executor. Therefore, to further elaborate the code script execution process, the method 1200 is initiated at step 1202. At step 1204, the method 1200 may include validating the generated code scripts using an automatic validator. The automatic validator may be a code parser. This validation process helps maintain the integrity and accuracy of the code scripts generated by the system.

The method 1200 may further include retrieving the code for each sub-task from repository, at step 1206. Each sub-task corresponds to one of the previously decomposed sub-questions, ensuring a direct connection between the code and its intended purpose. This retrieval is a crucial preparatory step for the subsequent execution of the code scripts. It should be noted that the term "sub-task" and "sub-question" are used interchangeably in one or more embodiments of the present disclosure.

At step 1208, the method 1200 may further include merging the retrieved code and writing it to a code file.

Once the retrieved code is written to the code file, the method 1200 starts at step 1210 further include executing the code file as a script. The code file typically includes target programming language that has been generated, validated, and interpreted in earlier stages of the process. Executing the code is essential to retrieve structured data from multiple tables in the database. This dynamic execution ensures that the system retrieves the necessary information from the interconnected table.

Further, the method 1200 may include saving the output of the script to a separate file, at step 1212. Saving the output data is integral to the subsequent stages of the process, particularly for generating answers to complex user questions. The method 1200 ends at 1214.

Figure 13:
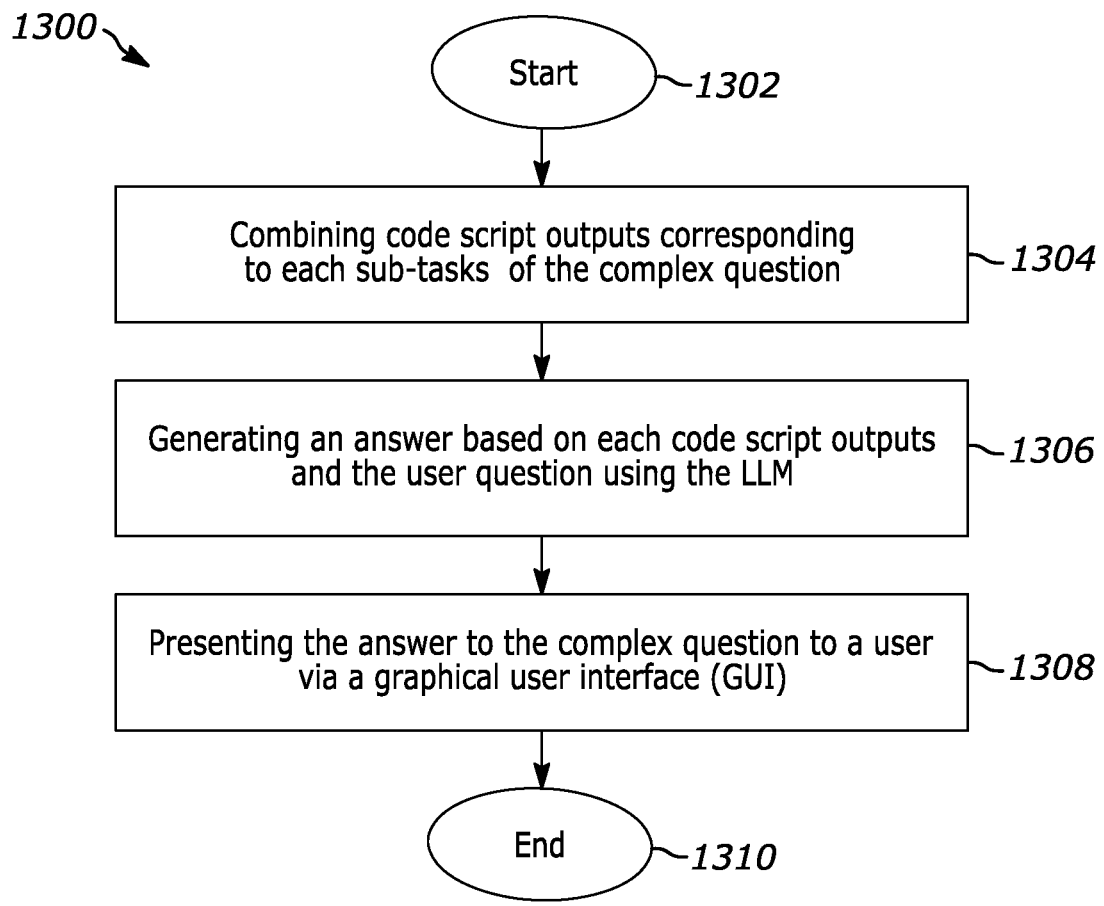
FIG. 13 illustrates a flow diagram of a method for presenting answer to a complex question to a user, in accordance with an example embodiment.

FIG. 13 illustrates a flow diagram of a method 1300 for presenting answer to a complex question to a user, in accordance with an example embodiment. It will be understood that each block of the flow diagram of the method 1300 may be implemented by various means, such as hardware, firmware, processor, circuitry, and/or other communication devices associated with execution of software including one or more computer program instructions. For example, one or more of the procedures described above may be embodied by computer program instructions. In this regard, the computer program instructions which embody the procedures described above may be stored by a memory 106 of the question answering device 102, employing an embodiment of the present disclosure and executed by a processor 108. As will be appreciated, any such computer program instructions may be loaded onto a computer or other programmable apparatus (for example, hardware) to produce a machine, such that the resulting computer or other programmable apparatus implements the functions specified in the flow diagram blocks. These computer program instructions may also be stored in a computer-readable memory that may direct a computer or other programmable apparatus to function in a particular manner, such that the instructions stored in the computer-readable memory produce an article of manufacture the execution of which implements the function specified in the flowchart blocks. The computer program instructions may also be loaded onto a computer or other programmable apparatus to cause a series of operations to be performed on the computer or other programmable apparatus to produce a computer-implemented process such that the instructions which execute on the computer or other programmable apparatus provide operations for implementing the functions specified in the flow diagram blocks.

Accordingly, blocks of the flow diagram support combinations of means for performing the specified functions and combinations of operations for performing the specified functions for performing the specified functions. It will also be understood that one or more blocks of the flow diagram, and combinations of blocks in the flow diagram, may be implemented by special purpose hardware-based computer systems which perform the specified functions, or combinations of special purpose hardware and computer instructions.

FIG. 13 is explained in conjunction with elements from FIGS. 1, 2, 3, 4, 5, 6, 7, 8, 9, 10, 11, and 12. The method 1300 is initiated at step 1302. At step 1304, the method 1300 may include combining code script outputs corresponding to each sub-tasks of the complex question.

At step 1306, the method 1300 may further include generating an answer based on each code script output and the user question using the LLM. This step is essential, as it involves processing the integrated information to formulate a response that directly addresses the user's inquiry.

At step 1308, the method 1300 may further include presenting the answer to the complex question to a user via a graphical user interface (GUI). The GUI serves as the interface through which the user may interact with and absorb the answer, offering a user-friendly experience. The method 1300 ends at step 1310.

As will be appreciated by those skilled in the art, the techniques described in the various embodiments discussed above are not routine, or conventional, or well understood in the art. The techniques discussed above provide for multi-table question answering, a highly sophisticated and innovative approach to addressing complex user queries that span multiple data tables. The disclosed system and method exhibit various advantages that distinguish them from routine or conventional methods:

Firstly, the approach involves use of one or more of but not limited to coreference resolution, dependency parsing, chunking and prompts to decompose complex questions into manageable sub-questions, generate code scripts for each sub-question, and subsequently retrieve structured data from multiple tables. This process offers a level of granularity and precision in addressing user inquiries that is not achieved through routine methods.

Secondly, the incorporation of schema descriptions, which may be dynamically provided for specific tables and columns, ensures flexibility and adaptability to various databases without rigidly adhering to fixed schemas. This adaptability is a distinctive feature of the disclosed technique.

Furthermore, the utilization of an automatic validator in the code parsing phase adds robustness to the system, ensuring that the generated code scripts are accurate and valid. This contributes to the reliability of the final answers generated.

Additionally, the system provides the final answers to users via a graphical user interface (GUI), enhancing user experience and accessibility. The GUI serves as an intuitive platform for users to interact with and understand the generated answers.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Moreover, although the foregoing descriptions and the associated drawings describe example embodiments in the context of certain example combinations of elements and/or functions, it should be appreciated that different combinations of elements and/or functions may be provided by alternative embodiments without departing from the scope of the appended claims. In this regard, for example, different combinations of elements and/or functions than those explicitly described above are also contemplated as may be set forth in some of the appended claims. Although specific terms are employed herein, they are used in a generic and descriptive sense only and not for purposes of limitation.

It is to be understood that the above description is intended to be illustrative, and not restrictive. For example, the above-discussed embodiments may be used in combination with each other. Many other embodiments will be apparent to those of skill in the art upon reviewing the above description.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions, and improvements to the embodiments described above are possible. It is contemplated that these variations, modifications, additions, and improvements fall within the scope of the invention.

We claim:

1. A computer-implemented method for multi-table question answering, comprising:
   receiving a complex question from a user;
   decomposing the complex question into one or more sub-questions, wherein the one or more sub-questions are in natural language;
   fine-tuning a Large Language Model (LLM) on a database schema as input to generate description as response;
   employing a Prompt Engine to instruct the fine-tuned LLM along with the database schema to generate database schema description;
   incorporating the generated database schema description while generating code scripts for each of the one or more sub-questions, to specify table and column information;
   executing the generated code scripts to retrieve relevant structured-data from a plurality of tables; and
   generating an answer to the complex question based on the retrieved structured-data.

2. The computer-implemented method of claim 1, wherein the complex question is decomposed into the one or more sub-questions using one or more of: coreference resolution, dependency parsing, chunking, and prompt techniques.

3. The computer-implemented method of claim 2, further comprising:
   generating a pseudo code for each of the one or more sub-questions using the LLM;
   parsing the generated pseudo code to generate corresponding code-scripts using the LLM in sub-question parser;
   executing the generated code scripts to retrieve relevant structured-data from the plurality of tables; and
   generating the answer to the complex question based on the retrieved structured-data.

4. The computer-implemented method of claim 3, further comprising employing the Prompt Engine to instruct the LLM for each respective task comprising schema description generation, pseudo code generation, code script generation, and answer generation.

5. The computer-implemented method of claim 1, further comprising:
   validating the generated code scripts using an automatic validator, wherein the automatic validator is a code parser; and
   retrieving the code for each sub-task from a repository, merging the retrieved code, and writing the retrieved code to a code file.

6. The computer-implemented method of claim 5, further comprising:
   executing the code file as a script; and
   saving output of the script to a separate file.

7. The computer-implemented method of claim 6, further comprising:
   combining code script outputs corresponding to each sub-tasks of the complex question; and
   generating the answer based on each of the code script outputs and the complex question using the LLM.

8. The computer-implemented method of claim 1, wherein the database schema description for the table and column are dynamically generated and updated based on external descriptions provided for individual tables and columns.

9. The computer-implemented method of claim 1, wherein the database schema description is formatted by the LLM in a format: Column Name Data Type Description.

10. The computer-implemented method of claim 1, wherein the answer to the complex question is presented to the user via a graphical user interface (GUI).

11. A computer system for multi-table question answering, the computer system comprising: one or more computer processors, one or more computer readable memories, one or more computer readable storage devices, and program instructions stored on the one or more computer readable storage devices for execution by the one or more computer processors via the multi-table question answering, comprising:
   receiving a complex question from a user;
   decomposing the complex question into one or more sub-questions, wherein the one or more sub-questions are in natural language;
   fine-tuning a Large Language Model (LLM) on a database schema as input to generate description as response;
   employing a Prompt Engine to instruct the fine-tuned LLM along with the database schema to generate database schema description;

incorporating the generated database schema description while generating code scripts for each of the one or more sub-questions, to specify table and column information;

executing the generated code scripts to retrieve relevant structured-data from a plurality of tables; and generating an answer to the complex question based on the retrieved structured-data.

12. The computer system of claim 11, wherein the complex question is decomposed into the one or more sub-questions using one or more of: coreference resolution, dependency parsing, chunking, and prompt techniques.

13. The computer system of claim 12, further comprising:

generating a pseudo code for each of the one or more sub-questions using the LLM;

parsing the generated pseudo code to generate corresponding code-scripts using the LLM in sub-question parser;

executing the generated code scripts to retrieve relevant structured-data from the plurality of tables; and generating the answer to the complex question based on the retrieved structured-data.

14. The computer system of claim 9, further comprising:

validating the generated code scripts using an automatic validator, wherein the automatic validator is a code parser;

retrieving the code for each sub-task from a repository, merging the retrieved code, and writing the retrieved code to a code file;

executing the code file as a script; and saving output of the script to a separate file.

15. The computer system of claim 14, further comprising:

combining code script outputs corresponding to each sub-tasks of the complex question; and generating the answer based on each of the code script outputs and the complex question using the LLM.

16. A non-transitory computer-readable storage medium having stored thereon computer executable instructions, which when executed by one or more processors, cause the one or more processors to carry out operations for multi-table question answering, the operations comprising:

receiving a complex question from a user;

decomposing the complex question into one or more sub-questions, wherein the one or more sub-questions are in natural language;

fine-tuning a Large Language Model (LLM) on a database schema as input to generate description as response;

employing a Prompt Engine to instruct the fine-tuned LLM along with the database schema to generate database schema description;

incorporating the generated database schema description while generating code scripts for each of the one or more sub-questions, to specify table and column information;

executing the generated code scripts to retrieve relevant structured-data from a plurality of tables; and generating an answer to the complex question based on the retrieved structured-data.

17. The non-transitory computer-readable storage medium of claim 16, wherein the database schema description for the table and column are dynamically generated and updated based on external descriptions provided for individual tables and columns.

18. The non-transitory computer-readable storage medium of claim 16, further comprising:

validating the generated code scripts using an automatic validator, wherein the automatic validator is a code parser; and retrieving the code for each sub-task from a repository, merging the retrieved code, and writing the retrieved code to a code file.

19. The non-transitory computer-readable storage medium of claim 16, further comprising utilizing a default code file with data loader including a library of pre-defined code templates for generating the code scripts.

20. The computer system of claim 13, further comprising employing the Prompt Engine to instruct the LLM for each respective task comprising schema description generation, pseudo code generation, code script generation, and answer generation.

* * * * *